United States Patent
Zhang et al.

(10) Patent No.: US 12,206,339 B1
(45) Date of Patent: Jan. 21, 2025

(54) METHOD FOR HYBRID CONTROL OF GRID-CONNECTED INVERTER BASED ON TIME SHARING OF A VOLTAGE SOURCE AND A CURRENT SOURCE

(71) Applicant: HEFEI UNIVERSITY OF TECHNOLOGY, Anhui (CN)

(72) Inventors: Xing Zhang, Hefei (CN); Feng Han, Hefei (CN); Xiangdui Zhan, Hefei (CN); Xinxin Fu, Hefei (CN); Jilei Wang, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/673,927

(22) Filed: May 24, 2024

(30) Foreign Application Priority Data

Aug. 3, 2023 (CN) .......................... 202310966915.7

(51) Int. Cl.
*H02M 7/5387* (2007.01)
*H02J 3/38* (2006.01)
*H02M 7/48* (2007.01)

(52) U.S. Cl.
CPC ........... *H02M 7/53871* (2013.01); *H02J 3/38* (2013.01); *H02M 7/48* (2013.01)

(58) Field of Classification Search
CPC .......... H02J 3/381; H02J 3/38; H02J 2203/20; H02J 2300/24; H02J 3/36; H02J 2300/28;
(Continued)

(56) References Cited

U.S. PATENT DOCUMENTS 4,982,147 A * 1/1991 Lauw .................... H02P 25/024
318/722
5,504,667 A * 4/1996 Tanaka ................ H02M 5/4505
363/39
(Continued)

FOREIGN PATENT DOCUMENTS

CA 3007781 A1 6/2017
CN 107167689 A * 9/2017 ........... G01R 31/027
(Continued)

OTHER PUBLICATIONS

Li, Ming et al., Impedance Adaptive Dual-Mode Control of Grid-Connected Inverters With Large Fluctuation of SCR and Its Stability Analysis Based on D-Partition Method, IEEE Transactions on Power Electronics, 36(12):14420-14435, 2021.
(Continued)

*Primary Examiner* — Gustavo A Rosario-Benitez
(74) *Attorney, Agent, or Firm* — PORUS IP LLC

(57) ABSTRACT

A method for hybrid control of grid-connected inverter based on time sharing of a voltage source and a current source including at least one control process, each control process including N+M control cycles. N may be a number of control cycles of a grid-connected inverter operating in a voltage source mode, M may be a number of control cycles of the grid-connected inverter operating in a current source mode. The control cycles of the grid-connected inverter operating in a voltage source mode and a current source mode may switch by counting. Aiming at a problem of being difficult to realize stable operation under large fluctuations in SCR, the present disclosure realizes a time-sharing control of the voltage source mode and the current source mode through a control algorithm, hybrids features of both mode, improves the stability of the grid-connected inverter, and realizes a stable operation under large fluctuations in SCR.

8 Claims, 7 Drawing Sheets

(58) Field of Classification Search
CPC ........ H02J 3/01; H02J 3/50; H02J 3/48; H02J 3/24; H02J 3/241; H02J 9/062; H02J 3/16; H02J 3/40; H02J 50/12; H02J 2300/20; H02J 3/18; H02J 3/32; H02J 9/061; H02J 3/46; H02J 2310/48; H02J 2207/20; H02J 3/28; H02J 7/00712; H02J 9/068; H02J 3/001; H02J 50/005; H02J 50/10; H02J 7/345; H02J 2203/10; H02J 2207/50; H02J 3/00; H02J 3/1814; H02J 3/44; H02J 50/70; H02J 2300/40; H02J 50/001; H02J 7/00; H02J 7/0071; H02J 3/0012; H02J 3/002; H02J 3/12; H02J 3/1842; H02J 3/1864; H02J 5/00; H02J 7/007182; H02J 7/02; H02J 9/06; H02J 3/007; H02J 3/02; H02J 3/1821; H02J 3/1892; H02J 3/26; H02J 7/00302; H02J 7/0031; H02J 1/06; H02J 2003/365; H02J 3/06; H02J 50/90; H02J 7/00308; H02J 7/00714; H02J 7/007186; H02J 7/06; H02J 7/1492; H02J 1/10; H02J 13/00016; H02J 2300/10; H02J 2300/30; H02J 3/004; H02J 3/1807; H02J 3/1885; H02J 3/30; H02J 3/388; H02J 3/42; H02J 7/0016; H02J 7/0018; H02J 7/0047; H02J 7/0068; H02J 7/35; H02J 9/065; H02J 13/00002; H02J 2207/40; H02J 2300/22; H02J 2300/26; H02J 2310/14; H02J 2310/60; H02J 3/00125; H02J 3/0075; H02J 3/04; H02J 3/144; H02J 3/1835; H02J 3/466; H02J 4/00; H02J 50/40; H02J 7/0069; H02J 9/02; H02J 9/066; H02M 7/48; H02M 5/4585; H02M 1/12; H02M 3/156; H02M 5/458; H02M 1/126; H02M 3/10; H02M 3/1582; H02M 7/53871; H02M 1/0009; H02M 7/4815; H02M 7/493; H02M 1/0048; H02M 5/4505; H02M 1/007; H02M 1/08; H02M 1/14; H02M 7/49; H02M 1/44; H02M 1/32; H02M 5/225; H02M 7/483; H02M 7/487; H02M 7/4807; H02M 1/36; H02M 3/158; H02M 3/33584; H02M 7/06; H02M 7/4826; H02M 7/797; H02M 1/0058; H02M 3/1584; H02M 3/1588; H02M 1/0012; H02M 1/088; H02M 1/34; H02M 1/4208; H02M 5/275; H02M 7/537; H02M 1/15; H02M 3/157; H02M 7/219; H02M 7/4833; H02M 7/5387; H02M 7/5395; H02M 3/33507; H02M 3/33523; H02M 3/33569; H02M 7/1557; H02M 1/0043; H02M 1/0054; H02M 1/008; H02M 1/0845; H02M 1/38; H02M 3/28; H02M 3/33592; H02M 5/272; H02M 5/456; H02M 7/213; H02M 7/4811; H02M 7/5152; H02M 1/0074; H02M 1/083; H02M 3/335; H02M 3/33561; H02M 5/45; H02M 5/452; H02M 7/00; H02M 7/125; H02M 7/5236; H02M 1/0032; H02M 3/07; H02M 5/2573; H02M 5/44; H02M 7/445; H02M 1/0095; H02M 1/346; H02M 3/01; H02M 3/155; H02M 3/1555; H02M 3/33538; H02M 3/3372; H02M 3/3384; H02M 7/19; H02M 7/217; H02M 7/2173; H02M 7/4837; H02M 7/523; H02M 1/081; H02M 1/123; H02M 1/322; H02M 1/4225; H02M 1/4258; H02M 3/3353; H02M 3/33553; H02M 5/06; H02M 7/515; H02M 7/53876; H02M 1/0061; H02M 1/0064; H02M 1/0077; H02M 1/06; H02M 1/084; H02M 1/4241; H02M 3/135; H02M 3/137; H02M 3/142; H02M 3/3155; H02M 3/33573; H02M 3/33576; H02M 3/3382; H02M 5/08; H02M 5/293; H02M 7/1623; H02M 7/23; H02M 7/4835; H02M 7/533; H02M 7/53875; H02M 1/0003; H02M 1/009; H02M 1/143; H02M 1/4216; H02M 3/00; H02M 3/1563; H02M 3/315; H02M 3/338; H02M 5/14; H02M 5/297; H02M 7/05; H02M 7/1626; H02M 7/44; H02M 7/497; H02M 7/5157; H02M 7/538; H02M 7/5381; H02M 7/53835; H02M 1/00; H02M 1/0022; H02M 1/0051; H02M 1/0093; H02M 1/096; H02M 1/10; H02M 1/342; H02M 1/4275; H02M 3/005; H02M 3/1586; H02M 3/285; H02M 3/337; H02M 3/3376; H02M 3/3378; H02M 3/3385; H02M 5/00; H02M 5/04; H02M 5/10; H02M 5/22; H02M 5/257; H02M 5/2576; H02M 5/27; H02M 5/271; H02M 7/043; H02M 7/062; H02M 7/064; H02M 7/068; H02M 7/12; H02M 7/155; H02M 7/1555; H02M 7/162; H02M 7/17; H02M 7/5155; H02M 7/519; H02M 7/521; H02M 7/525; H02M 7/53873; H02M 7/539

See application file for complete search history.

(56) References Cited

U.S. PATENT DOCUMENTS

| | | | | |
|---|---|---|---|---|
| 6,366,483 | B1* | 4/2002 | Ma | H02M 1/4216 363/41 |
| 2017/0047862 | A1* | 2/2017 | Luo | H02M 7/53871 |
| 2021/0316623 | A1* | 10/2021 | Lehn | H02M 5/4585 |
| 2022/0352726 | A1* | 11/2022 | Zhang | H02J 3/48 |
| 2023/0208319 | A1* | 6/2023 | Tsuruma | H02M 7/53871 363/98 |
| 2023/0378764 | A1* | 11/2023 | Xu | H02M 7/44 |
| 2024/0113526 | A1* | 4/2024 | Miranbeigi | H02J 3/18 |

FOREIGN PATENT DOCUMENTS

| | | | | | |
|---|---|---|---|---|---|
| CN | 108039729 | A | * | 5/2018 | ............... H02J 3/38 |
| CN | 108933447 | A | | 12/2018 | |
| CN | 110021959 | A | | 7/2019 | |
| CN | 111030174 | A | * | 4/2020 | ............... H02J 3/38 |
| CN | 111049175 | A | * | 4/2020 | ............... H02J 3/36 |
| CN | 113991730 | A | | 1/2022 | |
| CN | 115940656 | A | | 4/2023 | |
| WO | 2019136577 | A1 | | 7/2019 | |
| WO | 2021233190 | A1 | | 11/2021 | |

OTHER PUBLICATIONS

Li, Ming et al., Hierarchical Mode-Dispatching Control for Multi-Inverter Power Stations, IEEE Transactions on Industrial Electronics, 2023, 10 pages.

Guo, Zixuan et al., Control and capacity planning for energy storage systems to enhance the stability of renewable generation under weak grids, IET Renewable Power Generation, 16: 761-780, 2022.

(56) References Cited

OTHER PUBLICATIONS

Luiz A. M. Lima et al., Hybrid Control Scheme for VSC Presenting Both Grid-Forming and Grid-Following Capabilities, IEEE Transactions on Power Delivery, 2022, 12 pages.
The Second Office Action in Chinese Application No. 202310966915.7 mailed on Sep. 23, 2023, 10 pages.
Decision to Grant a Patent in Chinese Application No. 202310966915.7 mailed on Oct. 8, 2023, 3 pages.

* cited by examiner

METHOD FOR HYBRID CONTROL OF GRID-CONNECTED INVERTER BASED ON TIME SHARING OF A VOLTAGE SOURCE AND A CURRENT SOURCE

CROSS-REFERENCE TO RELATED APPLICATION

This application claims priority of Chinese Patent Application No. 202310966915.7, filed on Aug. 3, 2023, the contents of each of which are entirely incorporated herein by reference.

TECHNICAL FIELD

The present disclosure relates to the field of grid-connected inverter control technology, and specifically relates to a method for hybrid control of a grid-connected inverter based on time sharing of a voltage source and a current source.

BACKGROUND

With increasing penetration and decentralization of new energy power generation, it may be necessary to connect new energy power generation to a distribution grid with long-distance transmission lines as well as a plurality of transformers. However, public grids may be generally characterized as weak grids due to a non-negligible grid impedance. A grid strength may generally be defined according to a Short Circuit Ratio (SCR), when SCR>3, the grid may be regarded as a strong grid; when 2<SCR≤3, the grid may be regarded as a weak grid; when SCR≤2, the grid may be regarded as an extremely weak grid. In addition, an intermittent and fluctuating nature of the new energy power generation may lead to great fluctuations in the SCR, which seriously threats a stable and efficient operation of a grid-connected inverter. A grid-connected inverter may convert a Direct Current (DC) power source to an Alternating Current (AC) power source, and an output voltage of the grid-connected inverter may have the same frequency as a grid frequency (e.g., 50 or 60 Hz). There may be two main control mode for the grid-connected inverter: a current source mode and a voltage source mode. The grid-connected inverter controlled by the current source mode may have better stability under the strong grid, and weaker stability under the weak grid and the very weak grid; conversely, the grid-connected inverter controlled by the voltage source mode may have better stability under the weak grid and even the very weak grid, but may have difficulty operating stably under the strong grid.

There are several academic papers as well as patents addressing the issue of stability of the grid-connected inverters under conditions of great fluctuations in SCR, for example:

1) Literature "*Impedance adaptive dual-mode control of grid-connected inverters with large fluctuation of SCR and its stability analysis based on D-partition method*" vol. 36, 2021, pages 14420-14435 proposes an impedance adaptive dual-mode control strategy: the voltage source mode may be adopted under the weak grid and the current source mode may be adopted under the strong grid, thereby achieving a stable operation of the grid-connected inverter under the fluctuation of the SCR. However, this dual-mode control strategy relies on an accurate online measurement of the grid impedance and a real-time switching of the control mode, which is difficult to apply in large-scale systems.

2) Literature "*Hierarchical mode-dispatching control for multi-inverter power stations*" vol. 70, 2023, pages 10044-10054 proposes a hierarchical mode-dispatching control strategy for multi-inverter field stations based on a dual mode of current source and voltage source, which enables a real-time dispatch of numbers of the grid-connected inverters operating in the current source mode as well as in the voltage source mode based on the fluctuation of the SCR. However, there is no precise definition of the SCR in a multi-inverter system, making a detection difficult.

3) Literature "*Control and Capacity Planning for Energy Storage Systems to Enhance the Stability of Renewable Generation under Weak Grids*", vol. 16, 2022, pages 761-780 proposes a mixed-mode field station strategy to enhance the stability of the field station by accessing a certain amount of voltage source mode grid-connected inverters to the current source mode field station. However, this approach requires a modification on the grid-connected inverter in the voltage source mode. The paper enhances a strong grid stability of the grid-connected inverter in the voltage source mode by virtual inductor, but this approach significantly reduces the voltage on the grid-connected inverter side, requiring a more reactive response to maintain a voltage operation point.

4) Literature "*Hybrid control scheme for VSC presenting both grid-forming and grid-following capabilities*", vol. 37, 2022, pages 4570-4581 proposes a hybrid control strategy for the current source mode and the voltage source mode, in which two independent virtual grid-parallel inverters are simulated to work in parallel by a hybrid control converter, so that they have features of both the current source mode grid-connected inverter and the voltage source mode grid-connected inverter. However, the hybrid control converter in this scheme essentially presents the parallel feature of the current source mode grid-connected inverter and the voltage source mode grid-connected inverter, and is unable to operate stably under the condition of large fluctuation of SCR.

5) The Chinese patent document CN110021959A disclosed on Jul. 16, 2019, "Double-mode control method for grid-connected inverter based on short-circuit ratio under weak power grid", proposes a double-mode control method of the grid-connected inverter based on a short-circuit ratio under a weak grid, which accurately and intuitively reflects a state of the weak grid, and provides a basis for the switching between the current source mode and the voltage source mode of the grid-connected inverter, which ensures the stable operation of the grid-connected inverter. However, this double-mode control strategy relies on the accurate on-line measurement of the grid impedance as well as a real-time switching of the control mode, which is difficult to apply in the large-scale systems.

Consolidating the above literatures, the mode-switching based manner requires the accurate online measurement of the grid impedance on one hand, and a frequent mode-switching on the other hand, which is very difficult to be applied in the large-scale systems; the mixed-mode based manner is essentially a parallel combination of the current source mode and the voltage source mode, whose stability still depends on the voltage source mode and may not be stabilized when the SCR fluctuates greatly.

Therefore, it is expected to provide a method for hybrid control of the grid-connected inverter based on time sharing of the voltage source and the current source, which improves the stability of the grid-connected inverter and realize the stable operation under the large fluctuation of the SCR.

SUMMARY

The technical problem to be solved by embodiments of the present disclosure is that the conventional control of a grid-connected inverter is unable to adapt to a large change in SCR, and the stability of the grid-connected system is threatened. Specifically, the embodiments of the present disclosure address the problem that under large fluctuations in the SCR, it may be difficult to realize stable operations in the current source mode and the voltage source mode, and in consideration of the fact that the stability of the two control mode is complementary to each other to a certain extent, a method for hybrid control of a grid-connected inverter based on time sharing of a voltage source and a current source is proposed. The method ensures the stable operation of the grid-connected inverter under the large fluctuation of SCR through a time-sharing control of the voltage-source and the current source modes, i.e., the voltage-source and current source modes take turns in controlling the grid-connected inverter for a certain period, significantly improving a grid-connecting quality of the inverter.

One or more embodiments of the present disclosure provide a method for hybrid control of a grid-connected inverter based on time sharing of a voltage source and a current source. The method may include at least one control process, each control process including N+M control cycles. N may be a number of control cycles of a grid-connected inverter operating in a voltage source mode, and M may be a number of control cycles of the grid-connected inverter operating in a current source mode.

Controlling the grid-connected inverter to operate in the voltage source mode, and counting once in each control cycle of the grid-connected inverter. A count value may be T, and each control process may include:

Step 1, controlling the grid-connected inverter to operate in the voltage source mode, and in response to an end of the each control cycle, comparing T and N:

in response to T<N, controlling the grid-connected inverter to continue operating in the voltage source mode, and counting the count value T once; and in response to T=N, controlling the grid-connected inverter to switch to the current source mode, assigning the count value T to zero, and entering step 2.

Step 2, controlling the grid-connected inverter to operate in the current source mode, and in response to the end of the each control cycle, comparing T and M:

in response to T<M, controlling the grid-connected inverter to continue operating in the current source mode, and counting the count value T once; and in response to T=M, controlling the grid-connected inverter to switch to the voltage source mode, assigning the count value T to zero, and entering step 3.

Step 3, returning to the step 1 and entering next control process.

In some embodiments, the controlling the grid-connected inverter to operate in the voltage source mode in step 1 may include:

Step 1.1, setting an active power command signal $P_{ref}$ and a reactive power command signal $Q_{ref}$.

Step 1.2, sampling grid-connected three-phase currents $i_{ga}$, $i_{gb}$, $i_{gc}$ output by the grid-connected inverter, sampling three-phase voltages $u_{pcca}$, $u_{pccb}$, $u_{pccc}$ with a common coupling point, and obtaining, based on the grid-connected three-phase currents $i_{ga}$, $i_{gb}$, $i_{gc}$ and the three-phase voltages $u_{pcca}$, $u_{pccb}$, $u_{pccc}$ with the common coupling point, αβ-axis components $i_{g\alpha}$, $i_{g\beta}$ of a grid-connected current and αβ-axis components $u_{pcc\alpha}$, $u_{pcc\beta}$ of a common coupling point voltage, respectively through a transformation from a three-phase stationary coordinate system to a two-phase stationary coordinate system.

Step 1.3, obtaining, based on the αβ-axis components $i_{g\alpha}$, $i_{g\beta}$ of the grid-connected current and the αβ-axis components $u_{pcc\alpha}$, $u_{pcc\beta}$ of the common coupling point voltage, an active grid-connected power $P_e$ and a reactive grid-connected power $Q_e$ through an average power calculation equation.

Step 1.4, obtaining, based on the active grid-connected power $P_e$ and the reactive grid-connected power $Q_e$, an output angular frequency ω of the grid-connected inverter and a d-axis voltage command signal $u_{dref}$ through a droop control equation; and obtaining, based on the output angular frequency ω of the grid-connected inverter, an output angle θ of the grid-connected inverter. θ=ω/s, and s may be a Laplacian operator.

Step 1.5, obtaining, based on the grid-connected three-phase currents $i_{ga}$, $i_{gb}$, $i_{gc}$, the three-phase voltage $u_{pcca}$, $u_{pccb}$, $u_{pccc}$ of the common coupling point, and the output angle θ of the grid-connected inverter, dq-axis components $i_{gd1}$, $i_{gq1}$ of the grid-connected current in the voltage source mode and dq-axis components $u_{pccd1}$, $u_{pccq1}$ Of the common coupling point voltage in the voltage source mode, respectively through a transformation from the three-phase stationary coordinate system to a two-phase rotating coordinate system.

Step 1.6, setting a q-axis voltage command signal $u_{qref}$, and obtaining, based on the d-axis voltage command signal $u_{dref}$ and the dq-axis components $u_{pccd1}$, $u_{pccq1}$ of the common coupling point voltage in the voltage source mode, dq-axis components $i_{dref1}$, $i_{qref1}$ of a current command signal in the voltage source mode through a voltage closed-loop control equation of the voltage source mode.

Step 1.7, obtaining, based on the dq-axis components $i_{gd1}$, $i_{gq1}$ of the grid-connected current in the voltage source mode and the dq-axis components $i_{dref1}$, $i_{qref1}$ Of the current command signal in the voltage source mode, dq-axis components $u_{d1}$, $u_{q1}$ of a control signal in the voltage source mode through a current closed-loop control equation of the voltage source mode.

Step 1.8, obtaining, based on the dq-axis components $u_{d1}$, $u_{q1}$ of the control signal in the voltage source mode, control signals $u_{a1}$, $u_{b1}$, $u_{c1}$ of the voltage source mode in the three-phase stationary coordinate system through the transformation from the two-phase rotating coordinate system to the three-phase stationary coordinate system.

In some embodiments, the controlling the grid-connected inverter to operate in the current source mode in step 2 may include:

Step 2.1, obtaining, based on the three-phase voltages $u_{pcca}$, $u_{pccb}$, $u_{pccc}$ of the common coupling point, dq-axis components $u_{pccd2}$, $u_{pccq2}$ of the common coupling point voltage in the current source mode through the transformation from the three-phase stationary coordinate system to the two-phase rotating coordinate system; and obtaining, based on the q-axis component $u_{pccq2}$ of the common coupling point voltage in the current source mode, the voltage phase angle φ of the common coupling point through the phase-locked loop control;

Step 2.2, obtaining, based on the voltage phase angle φ of the common coupling point and the grid-connected three-phase current $i_{ga}$, $i_{gb}$, $i_{gc}$, dq-axis components $i_{gd2}$, $i_{gq2}$ of the grid-connected current in current source mode through the transformation from the three-phase stationary coordinate system to the two-phase rotating coordinate system.

Step 2.3, obtaining, based on the active power command signal $P_{ref}$ and the reactive power command signal $Q_{ref}$ and the d-axis component $u_{pccd2}$ of the common coupling point voltage in the current source mode, dq-axis current command signal $i_{dref2}$, $i_{qref2}$ in the current source mode.

Step 2.4, obtaining, based on the dq-axis current command signal $i_{dref2}$, $i_{qref2}$ in the current source mode and the dq-axis current components $i_{gd2}$, $i_{gq2}$ of the grid-connected current in the current source mode, dq-axis components $u_{d2}$, $u_{q2}$ of a control signal in the current source mode through a current closed-loop control equation of the current source mode.

Step 2.5, obtaining, based on the voltage phase angle φ of the common coupling point and the dq-axis components $u_{d2}$, $u_{q2}$ of the control signal in the current source mode, control signals $u_{a2}$, $u_{b2}$, $u_{c2}$ of the current source mode in the three-phase stationary coordinate system through the transformation from the two-phase rotating coordinate system to the three-phase stationary coordinate system.

In some embodiments, the average power calculation equation in the step 1.3 may include:

$$P_e = 1.5(i_{g\alpha} \times u_{pcc\alpha} + i_{g\beta} \times u_{pcc\beta})/(T_{filter1} \times s + 1)$$

$$Q_e = 1.5(i_{g\alpha} \times u_{pcc\beta} - i_{g\beta} \times u_{pcc\alpha})/(T_{filter1} \times +1)$$

where, $T_{filter1}$ denotes a time constant of an average power calculation of a low-pass filter.

In some embodiments, the droop control equation in the step 1.4 may include:

$$\omega = (P_{ref} - P_e)/m + \omega_n$$

$$u_{dref} = (Q_{ref} - Q_e)/n + V_{nAmp}$$

where, $\omega_n$ denotes a rated angular frequency of a system, $V_{nAmp}$ denotes a rated line voltage amplitude, m denotes an active power droop coefficient, and n denotes a reactive power droop coefficient.

In some embodiments, the voltage closed-loop control equation of the voltage source mode in the step 1.6 may include:

$$i_{dref1} = (K_{vv\_p} + K_{vv\_i}/s)/(u_{dref} - u_{pccd1})$$

$$i_{qref1} = (K_{vv\_p} + K_{vv\_i}/s)/(u_{qref} - u_{pccd1})$$

where, $K_{vc\_p}$ denotes a proportional coefficient of a current closed-loop control PI regulator in the voltage source mode, and $K_{vc\_i}$ denotes an integral coefficient of the current closed-loop control PI regulator in the voltage source mode.

In some embodiments, the current closed-loop control equation of the voltage source mode in the step 1.7 may include:

$$u_{d1} = (K_{vc\_p} + K_{vc\_i}/s)/(i_{dref1} - i_{gd1})$$

$$u_{q1} = (K_{vc\_p} + K_{vc\_i}/s)/(i_{qref1} - i_{gq1})$$

where, $K_{cc\_p}$ denotes a proportional coefficient of the current closed-loop control PI regulator in the current source mode, and $K_{cc\_i}$ denotes an integral coefficient of the current closed-loop control PI regulator in the current source mode.

In some embodiments, in the step 2.1, based on a q-axis component $u_{pccq2}$ of the common coupling point voltage in the current source mode, a voltage phase angle q of the common coupling point through a phase-locked loop control may include:

$$\varphi = [\omega_n - (K_{p\_PLL} + K_{i\_PLL}/S) \times u_{pccq2}]/s$$

where, $\omega_n$ denotes a rated angular frequency of the system, $K_{p\_PLL}$ denotes a proportional coefficient of a phase-locked loop PI regulator, and $K_{i\_PLL}$ denotes an integral coefficient of a phase-locked loop PI regulator.

In some embodiments, the equations for calculating the dq-axis current command signal $i_{dref2}$, $i_{qref2}$ in the current source mode of a current command signal in the current source mode in the step 2.3 includes:

$$i_{dref2} = P_{ref}/[1.5 u_{pccd2}/(T_{filter2} \times s + 1)]$$

$$i_{qref2} = -Q_{ref}/[1.5 u_{pccd2}/(T_{filter2} \times s + 1)]$$

where, $T_{filter2}$ denotes a time constant of a power calculation of a low-pass filter in the current source mode.

In some embodiments, the current closed-loop control equation of the current source mode in the step 2.4 may include:

$$u_{d2} = (K_{cc\_p} + K_{cc\_i}/s)(i_{dref2} - i_{gd2})$$

$$u_{q2} = (K_{cc\_p} + K_{cc\_i}/s)(i_{qref2} - i_{gq2})$$

where, $K_{cc\_p}$ denotes a proportional coefficient of the current closed-loop control PI regulator in the current source mode, and $K_{cc\_i}$ denotes an integral coefficient of the current closed-loop control PI regulator in the current source mode.

BRIEF DESCRIPTION OF THE DRAWINGS

The present disclosure is further illustrated by way of exemplary embodiments, which will be described in detail by means of the accompanying drawings. These embodiments are not limiting, and in these embodiments, the same numbering denotes the same structure, wherein.

DETAILED DESCRIPTION

The accompanying drawings, which are required to be used in the description of the embodiments, are briefly described below. The accompanying drawings do not represent the entirety of the embodiments.

As used herein, "system", "device", "unit" and/or "module" are used as a means of distinguishing between different levels of components, elements, parts, sections, or assemblies. Words may be replaced by other expressions if other words would accomplish the same purpose.

As shown in the present disclosure and the claims, unless the context clearly suggests an exception, the words "one," "a", "an" and/or "the" do not refer specifically to the singular, but may also include the plural. Generally, the terms "including" and "comprising" suggest only the inclusion of clearly identified steps and elements. In general, the terms including" and "comprising" only suggest the inclusion of explicitly identified steps and elements that do not constitute an exclusive list, and the manner or apparatus may also include other steps or elements.

When describing the operations performed in the embodiments of the present disclosure in terms of the steps, the order of the steps are all interchangeable, the steps is omitted, and other steps is included in the process of the operation, if not otherwise specified.

Figure 1:
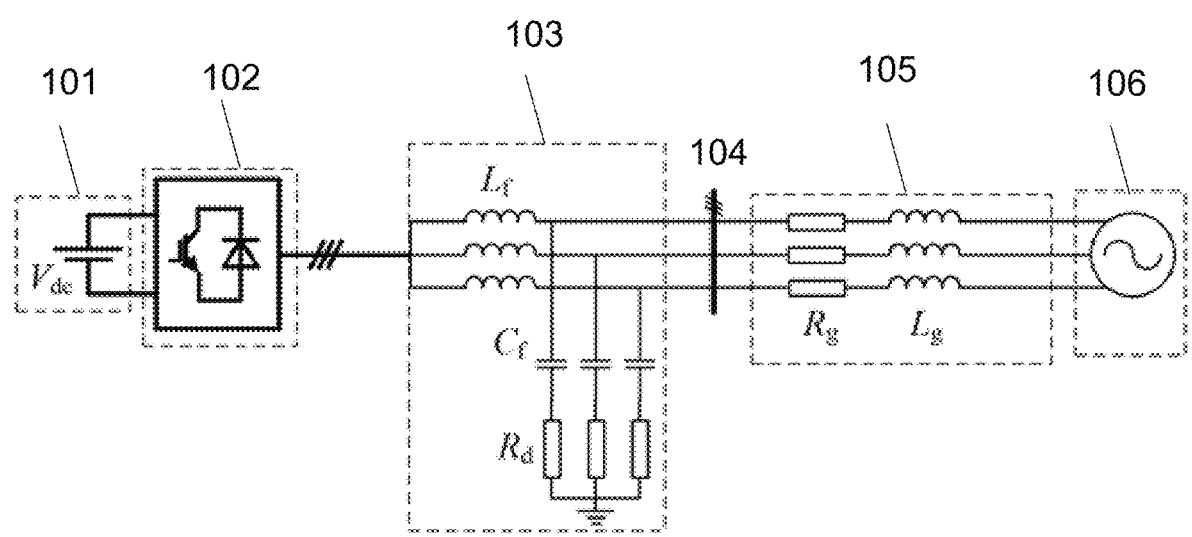
FIG. 1 is a topology diagram illustrating a grid-connected inverter system according to some embodiments of the present disclosure.

FIG. 1 is a topology diagram illustrating a grid-connected inverter system according to some embodiments of the present disclosure. As shown in FIG. 1, in some embodiments, a topology 100 may include a dc-side power supply Vdc 101, a three-phase full-bridge inverter circuit 102, a filter circuit 103, a grid impedance Zg 105 and a three-phase grid 106.

In some embodiments, the filter circuit 103 may include a filter inductor Lf, a filter capacitor Cf, and a damping resistor Rd. The three-phase full-bridge inverter circuit 102 may be connected in series between the dc-side power supply Vdc 102 and the filter inductor Lf, the other end of the filter inductor Lf may be connected to the grid impedance Zg 105, the filter capacitor Cf and the damping resistor Rd may be connected in parallel between the filter inductor Lf and the grid impedance Zg 105, and the grid impedance Zg 105 may be connected to the three-phase grid 106 to realize the grid-connection. The Rg in FIG. 1 may be a resistive component of the grid impedance Zg and Lg may be an inductive component of the grid impedance Zg. In some embodiments, the three-phase full-bridge inverter circuit 102 may include a grid-connected inverter for converting a DC power source to an AC power source required by the power grid. FIG. 1 also illustrates a common coupling point 104, which is a connection point between an electric utility and a user interface in a power system.

Merely by way of example, a voltage of the dc-side power supply Vdc 101 may be 770 V, an inductance value of the filter inductor Lf may be 0.9 mH, a capacitance value of the filter capacitor Cf may be 11.6 uF, a resistance value of the damping resistor Rd may be 0.3Ω, the resistive component Rg of the grid impedance Zg 105 may be 0Ω, and the inductive components Lg of the grid impedance Zg 105 is 15.4 mH, 11.55 mH, 2.57 mH, and 2.31 mH, respectively.

Figure 2:
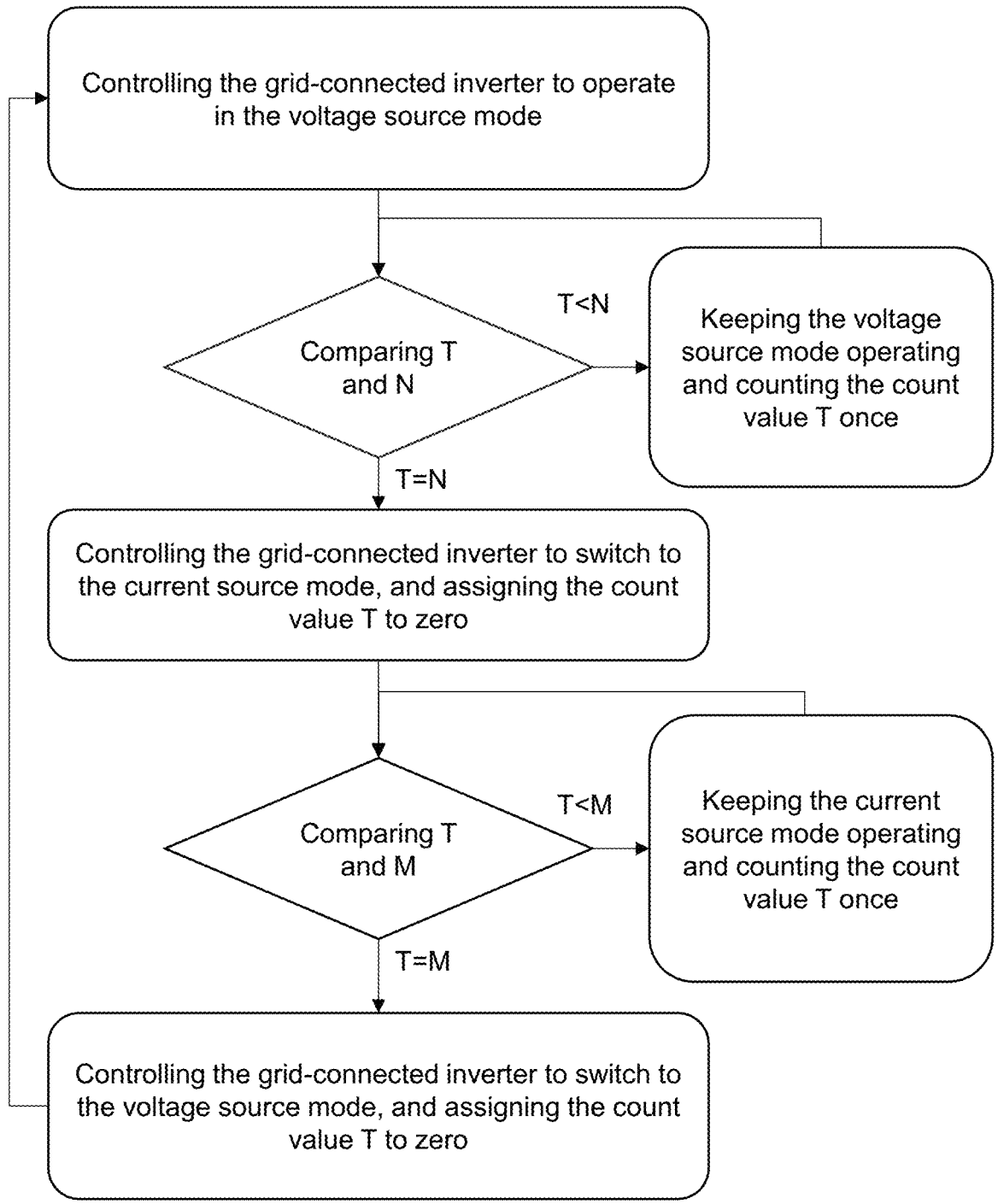
FIG. 2 is a flowchart illustrating an exemplary method for hybrid control of a grid-connected inverter based on time sharing of a voltage source and a current source according to some embodiments of the present disclosure.

FIG. 2 is a flowchart illustrating an exemplary method for hybrid control of a grid-connected inverter based on time sharing of a voltage source and a current source according to some embodiments of the present disclosure. In some embodiments, any of the steps in a process 200 may be performed by a processor.

The processor may be connected to a grid-connected inverter system and may control an operation of the grid-connected inverter system. The processor may process data and/or information obtained from other devices or components. The processor may execute program instructions based on such data, information, and/or processing results to perform one or more of the functions described in embodiments of the present disclosure. By way of example only, the processor may include, but not limited to, a central processing unit (CPU), a microprocessor (MCU), etc., or any combination of the above. In some embodiments, the processor may include a plurality of modules, and the different modules may be used to execute separate program instructions.

In some embodiments, the method for hybrid control includes at least one control process, each control process including N+M number of control cycles, where N denotes a number of control cycles of the grid-connected inverter operating in a voltage source mode, and M denotes a number of control cycles of the grid-connected inverter operating in a current source mode.

As mentioned earlier, the grid-connected inverter controlled by the current source mode may have better stability under a strong grid, and a weaker stability under weak and very weak grids; conversely, the grid-connected inverter controlled by the voltage source mode may have better stability under the weak and even very weak grids, but have difficulty operating stably under the strong grid. Therefore, in a case of significant fluctuation of the SCR, the stable operation of the grid-connected inverter may be achieved through a time-sharing control of the voltage source mode and the current source mode of the grid-connected inverter.

The control process involves controlling the grid-connected inverter to switch between the voltage source mode and the current source mode for once each. In some embodiments, each control cycle may include at least one continuous control cycle N operated in the voltage source mode, and at least one continuous control cycle M operated in the current source mode after the switch. The control cycle refers to a cycle of a drive signal that controls the grid-connected inverter. N and M may be pre-set.

In some embodiments, the values of N and M may be the same or different. In some embodiments, N=40 and M=40. In some embodiments, N=50, M=40. The values of N and M may be set empirically or may be set based on the SCR. In some embodiments, N and M may also be determined by a target control parameter. For more contents on the target control parameter, please refer to FIG. 7 and the associated descriptions.

In some embodiments, the processor may control the grid-connected inverter to operate in the voltage source mode, and count once in each control cycle of the grid-connected inverter.

In some embodiments, each control process may include:

Step 1, controlling the grid-connected inverter to operate in the voltage source mode, and in response to an end of the each control cycle, comparing T and N:

During each control cycle, the grid-connected inverter may operate in a voltage source mode according to the drive signal. When a cycle of the drive signal ends, it represents an end of the control cycle of the grid-connected inverter, and at this time, the current count value T may be compared with the preset N to determine whether to switch to the current source mode. An initial count value T may be assigned as zero.

In some embodiments, in response to T<N, controlling the grid-connected inverter to continue operating in the voltage source mode, and counting the count value T once.

When T<N, it means that the number of control cycles of the grid-connected inverter operating in the voltage source mode does not reach the pre-set number of control cycles, and the grid-connected inverter may continue to operate in the voltage source mode. In other words, the next control cycle may also operate in the voltage source mode. At the same time, the processor may make the count value T to count once to record the number of control cycles operated in the voltage source mode. In some embodiments, the processor may further compare the count values T and N corresponding to the next control cycle when the next control cycle ends.

In some embodiments, in response to T=N, controlling the grid-connected inverter to switch to the current source mode, assigning the count value T to zero, and entering step 2.

When T=N, it means that the number of control cycles of the grid-connected inverter operating in the voltage source mode has reached the preset number of control cycles, and the grid-connected inverter may be switched to the current source mode. In other words, the next control cycle may be operated in the current source mode. At the same time, the processor may assign the count value T to zero for the purpose of recording the number of control cycles operated in the current source mode.

Step 2, controlling the grid-connected inverter to operate in the current source mode, and in response to the end of each control cycle, comparing T and M.

When the grid-connected inverter is operating in the current source mode, it may be determined whether to switch to the voltage source mode based on a comparison between the count values T and M.

In some embodiments, in response to T<M, controlling the grid-connected inverter to continue operating in the current source mode.

In response to T<M, it means that the number of control cycles in the current control cycle in which the grid-connected inverter is running does not reach the preset number of control cycles, and it is necessary to continue to run in the current source mode. In other words, the next control cycle may also be operated in the voltage source mode. At the same time, the processor may use the count value T to count once to keep track of the number of control cycles running in current source mode. In some embodiments, the processor may further compare the magnitude of the count values T and M corresponding to the next control cycle when the next control cycle ends.

In some embodiments, in response to T=M, controlling the grid-connected inverter to switch to the voltage source mode, assigning the count value T to zero, and entering step 3.

When T=M, it indicates that the number of control cycles of the grid-connected inverter running in the current source mode in the current control cycle has reached the preset number of control cycles, and it needs to be switched to the voltage source mode in order to execute the next control process. At the same time, the processor may assign the count value T to zero for recording the number of control cycles running in the voltage source mode in the next control cycle.

Step 3, returning to the step 1 and entering a next control process.

When step 3 is executed, it indicates that the current control process is completed, and the grid-connected inverter has operated in the pre-determined N control cycles of the voltage source and M control cycles of the current source, and the processor may continue to execute the next control process. The processor may repeatedly execute the above steps 1 to 3 to perform the method for hybrid control of the grid-connected inverter based on time sharing of the voltage source and the current source as described in the embodiments of the present disclosure.

The implementation process of the embodiments of the present disclosure is simple. Compared to the voltage source mode or the current source mode alone, the time-sharing control of the voltage source mode and the current source mode is realized by a control algorithm, which is stable in a wider range, and overcomes a problem of substantial fluctuation of the SCR and helps to achieve a stable operation of the grid-connected inverter.

Compared to a dual-mode control strategy of the current source and the voltage source, the embodiment of the present disclosure does not require a detection of a system short circuit ratio or a frequent mode switching, which is more favorable for application in a large-scale new energy power generation system.

Compared to a mixed-mode strategy based on a parallel connection of the current source and the voltage source, the embodiments of the present disclosure avoids a complex capacity rationing calculation and is stable in a wider range.

Figure 8:
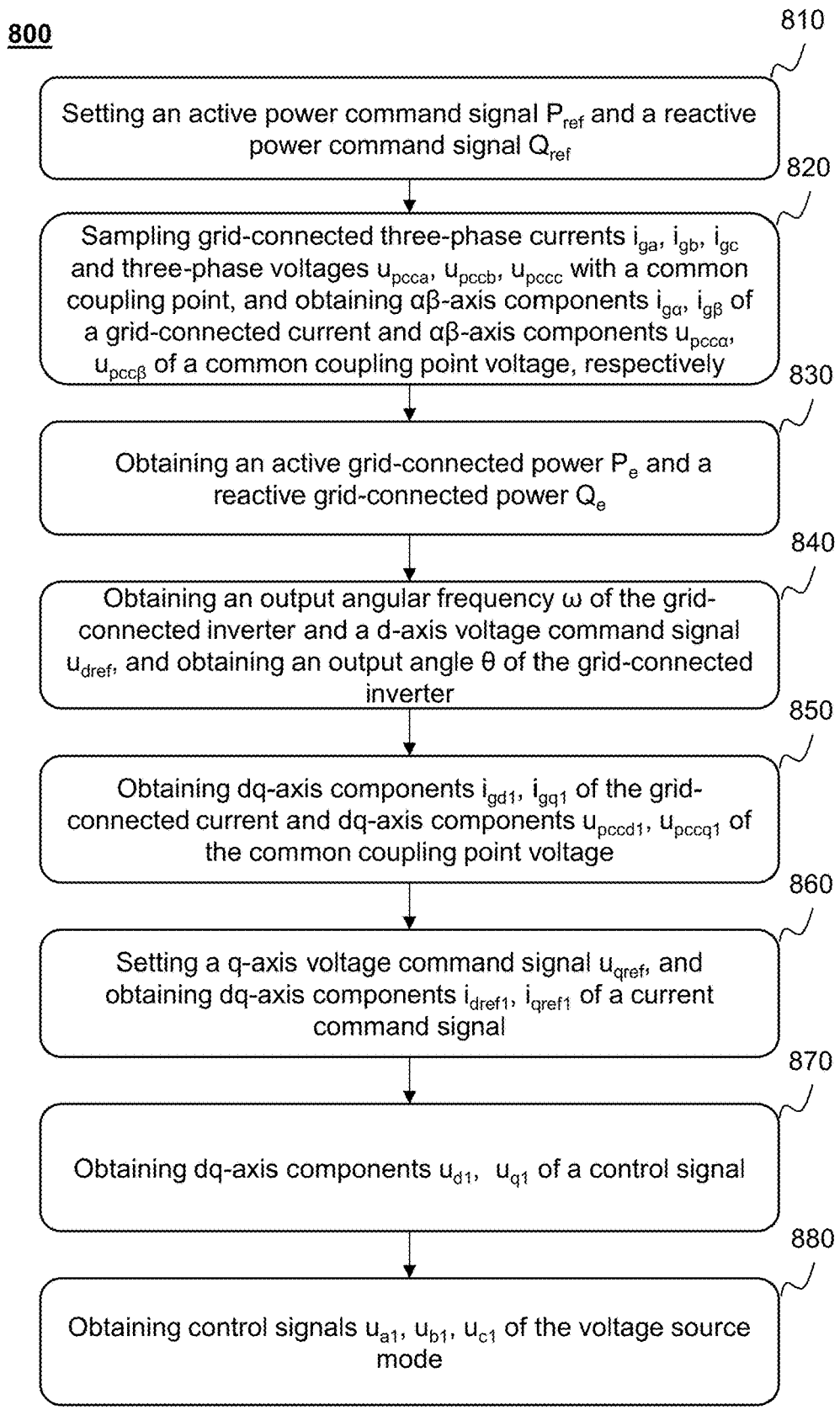
FIG. 8 is a flowchart illustrating an exemplary process for controlling the grid-connected inverter to operate in the voltage source mode according to some embodiments of the present disclosure.

In some embodiments, as shown in FIG. 8, the controlling the grid-connected inverter to operate in the voltage source mode in step 1 may include the steps of:

Step 1.1, setting an active power command signal $P_{ref}$ and a reactive power command signal $Q_{ref}$.

The power command signal refers to a value of energy or power to be delivered per unit of time that needs to be achieved by the signal in the grid-connected inverter. The power command signal may include the active power command signal $P_{ref}$ and the reactive power command signal $Q_{ref}$. In some embodiments, the processor may obtain the set active power command signal $P_{ref}$ and reactive power command signal $Q_{ref}$. For example, the processor may obtain the active power command signal $P_{ref}$ and a reactive power command signal $Q_{ref}$ input by a user.

In some embodiments, $P_{ref}$=20 KW and $Q_{ref}$=0 kW.

Step 1.2, sampling grid-connected three-phase currents $i_{ga}$, $i_{gb}$, $i_{gc}$ output by the grid-connected inverter, sampling three-phase voltage $u_{pcca}$, $u_{pccb}$, $u_{pccc}$ with a common coupling point, and obtaining, based on the grid-connected three-phase currents $i_{ga}$, $i_{gb}$, $i_{gc}$ and the three-phase voltages $u_{pcca}$, $u_{pccb}$, $u_{pccc}$ with the common coupling point, $\alpha\beta$-axis components $i_{ga}$, $i_{gb}$ of a grid-connected current and $\alpha\beta$-axis components $u_{pcca}$, $u_{pccb}$ of a common coupling point voltage, respectively through a transformation from a three-phase stationary coordinate system to a two-phase stationary coordinate system.

The grid-connected current refers to the current value output by the grid-connected inverter after converting a DC power source to an AC power source. The grid-connected three-phase current refers to the grid-connected current in a three-phase stationary coordinate system. As shown in FIG. 1, as a three-phase full-bridge inverter circuit is in series with the filter circuit, the grid impedance Zg and a three-phase grid, the grid-connected three-phase current output by the grid-connected inverter may be the same as the current values at a common coupling point and the three-phase grid. The common coupling point refers to a connection point between an electric utility and a user interface in the power system. Therefore, the three-phase voltage at the common coupling point may be the same as the three-phase voltage accessed by the user.

The three-phase stationary coordinate system refers to a stationary coordinate system that represents three-phase symmetrical voltage and current through space vectors in a complex plane. The space vector may represent both magnitude and direction. Three reference directions of the three-phase stationary coordinate system may be expressed as fixed directions A, B, and C, with a 120° angle apart from each other in the complex plane.

In some embodiments, the processor may directly sample, through a voltage detecting device and a current detecting device, the grid-connected three-phase currents $i_{ga}$, $i_{gb}$, $i_{gc}$ and the three-phase voltages, $u_{pcca}$, $u_{pccb}$, $u_{pccc}$ in the three-phase stationary coordinate system. The two-phase stationary coordinate system refers to a stationary coordinate system in which two orthogonal vectors are used to represent the AC voltage or current, also known as an αβ coordinate system. The α and β axes may be orthogonal.

In some embodiments, the processor may decompose the grid-connected three-phase currents $i_{ga}$, $i_{gb}$, $i_{gc}$ and/or the three-phase voltages $u_{pcca}$, $u_{pccb}$, $u_{pccc}$ under the three-phase stationary coordinate system into the a-axis and the β-axis, respectively, and introduce an amplitude change factor, so that the grid-connected current αβ-axis components $i_{g\alpha}$, $i_{g\beta}$ and the common coupling point voltage αβ-axis components $u_{pcc\alpha}$, $u_{pcc\beta}$ may be obtained, thereby completing a transformation from the three-phase stationary coordinate system to the two-phase stationary coordinate system. The amplitude change factor may be ⅔.

Step 1.3, obtaining, based on the αβ-axis components $i_{g\alpha}$, $i_{g\beta}$ of the grid-connected current and the αβ-axis components $u_{pcc\alpha}$, $u_{pcc\beta}$ of the common coupling point voltage, an active grid-connected power $P_e$ and a reactive grid-connected power $Q_e$ through an average power calculation equation.

The grid-connected power refers to a power of a transmission line transmitting an electrical energy to the grid. In some embodiments, the grid-connected power may include active grid-connected power $P_e$ and a reactive grid-connected power $Q_e$. An average power calculation equation may be used to calculate the grid-connected power based on the grid-connected current and the common coupling point voltage.

In some embodiments, the average power calculation equation may include:

$$P_e = 1.5(i_{g\alpha} \times u_{pcc\alpha} + i_{g\beta} \times u_{pcc\beta})/(T_{filter1} \times s + 1)$$

$$Q_e = 1.5(i_{g\alpha} \times u_{pcc\beta} - i_{g\beta} \times u_{pcc\alpha})/(T_{filter1} \times s + 1)$$

where, $P_e$ denotes the active grid-connected power, $Q_e$ denotes the reactive grid-connected power, $T_{filter1}$ denotes a time constant of an average power calculation of a low-pass filter, s denotes a Laplace operator, $i_{g\alpha}$ denotes the α-axis component of the grid-connected current in the two-phase stationary coordinate system, and $i_{g\beta}$ denotes the β-axis component of the grid-connected current, $u_{pcc\alpha}$ denotes the α-axis component of the common coupling point voltage in the two-phase stationary coordinate system, and $u_{pcc\beta}$ denotes the β-axis component of the common coupling point voltage. In some embodiments, $T_{filter1}=0.02$ s.

Step 1.4, obtaining, based on the active grid-connected power $P_e$ and the reactive grid-connected power $Q_e$, an output angular frequency ω of the grid-connected inverter and a d-axis voltage command signal $u_{dref}$ through a droop control equation; and obtaining, based on the output angular frequency ω of the grid-connected inverter, an output angle θ of the grid-connected inverter, where θ=ω/s, and s is a Laplacian operator.

The output angular frequency of the grid-connected inverter refers to the angular frequency of an AC signal output from the grid-connected inverter. The output angle of the grid-connected inverter refers to the angle of the AC signal output by the grid-connected inverter. The voltage command signal refers to a voltage value that needs to be reached by the signal output by the grid-connected inverter. The d-axis voltage command signal $u_{dref}$ refers to the voltage command signal of the d-axis in the two-phase rotating coordinate system. In some embodiments, the droop control equation may obtain the output angular frequency ω and d-axis voltage command signal $u_{dref}$ of the grid-connected inverter based on the grid-connected power calculation.

In some embodiments, the droop control equation may include:

$$\omega = (P_{ref} - P_e)/m + \omega_n$$

$$u_{dref} = (Q_{ref} - Q_e)/n + V_{nAmp}$$

where, ω denotes the output angular frequency of the grid-connected inverter, $u_{dref}$ denotes the d-axis voltage command signal, $\omega_n$ denotes a rated angular frequency of a system, $V_{nAmp}$ denotes a rated line voltage amplitude, m denotes an active power droop coefficient, and n denotes a reactive power droop coefficient, $P_{ref}$ denotes the active power command signal, and $Q_{ref}$ denotes the reactive power command signal. In some embodiments, $\omega_n = 100\pi$, $V_{nAmp} = 311$ V, m=0.0001413, and n=0.0010885.

Step 1.5, obtaining, based on the grid-connected three-phase currents $i_{ga}$, $i_{gb}$, $i_{gc}$, the three-phase voltages $u_{pcca}$, $u_{pccb}$, $u_{pccc}$ of the common coupling point, and the output angle θ of the grid-connected inverter, dq-axis components $i_{gd1}$, $i_{gq1}$ of the grid-connected current in the voltage source mode and dq-axis components $u_{pccd1}$, $u_{pccq1}$ of the common coupling point voltage in the voltage source mode, respectively through a transformation from the three-phase stationary coordinate system to a two-phase rotating coordinate system.

The two-phase rotating coordinate system refers to a coordinate system that has been rotated by a certain angle with respect to the stationary coordinate system, also known as the dq coordinate system. The axes of the two-phase rotating coordinate system may be the d-axis and the q-axis which are orthogonal. In some embodiments, the processor may realize a transformation from the three-phase stationary coordinate system to the two-phase rotating coordinate system through a coordinate transformation matrix.

Step 1.6, setting a q-axis voltage command signal $u_{qref}$, and obtaining, based on the d-axis voltage command signal $u_{dref}$ and the dq-axis components $u_{pccd1}$, $u_{pccq1}$ of the common coupling point voltage in the voltage source mode, dq-axis components $i_{dref1}$, $i_{qref1}$ of a current command signal in the voltage source mode through a voltage closed-loop control equation of the voltage source mode.

The q-axis voltage command signal, $u_{qref}$, refers to the voltage command signal of the q-axis in the two-phase rotating coordinate system. The voltage closed-loop control equation may be used to determine the current command signal. The current command signal refers to the current value that needs to be achieved by the signal output from the grid-connected inverter.

In some embodiments, the voltage closed-loop control equation for the voltage source mode may include:

$$i_{dref1} = (K_{vv\_p} + K_{vv\_i}/s)/(u_{dref} - u_{pccd1})$$

$$i_{qref1} = (K_{vv\_p} + K_{vv\_i}/s)/(u_{qref} - u_{pccq1})$$

where, $i_{dref1}$ denotes the d-axis component of the current command signal of the voltage source mode, $i_{qref1}$ denotes the q-axis component of the current command signal of the voltage source mode, $K_{vv\_p}$ denotes a proportional coefficient of a voltage closed-loop control proportional-integral (PI) regulator in the voltage source mode, and $K_{vv\_i}$ denotes an integral coefficient of the voltage closed-loop control PI regulator in the voltage source mode, $u_{dref}$ denotes the d-axis voltage command signal, $u_{qref}$ denotes the q-axis voltage command signal, $u_{pccd1}$ denotes the d-axis component of the voltage at the common coupling point of the voltage source mode, and $u_{pccq1}$ denotes the q-axis component of the voltage at the common coupling point of the voltage source mode.

In some embodiments, $K_{vv\_p}=0.5$ and $K_{vv\_i}=120$.

Step 1.7, obtaining, based on the dq-axis components $i_{gd1}$, $i_{gq1}$ of the grid-connected current in the voltage source mode and the dq-axis components $i_{dref1}$, $i_{qref1}$ of the current command signal in the voltage source mode, dq-axis components $u_{d1}$, $u_{q1}$ of a control signal in the voltage source mode through a current closed-loop control equation of the voltage source mode.

The current closed-loop control equation may be used to determine the voltage command signal.

In some embodiments, the current closed-loop control equation for the voltage source mode may include:

$$u_{d1}=(K_{vc\_p}+K_{vc\_i}/S)/(i_{dref1}-i_{gd1})$$

$$u_{q1}=(K_{vc\_p}+K_{vc\_i}/S)/(i_{qref1}-i_{gq1})$$

where, $u_{d1}$ denotes the d-axis component of the control signal for the voltage source mode, $u_{q1}$ denotes the q-axis component of the control signal for the voltage source mode, $K_{vc\_p}$ denotes a proportional coefficient of a current closed-loop control PI regulator in the voltage source mode, and $K_{vc\_i}$ denotes an integral coefficient of the current closed-loop control PI regulator in the voltage source mode, $i_{dref1}$ denotes the d-axis component of the current command signal for the voltage source mode, $i_{qref1}$ denotes the q-axis component of the current command signal for the voltage source mode, $i_{gd1}$ denotes the d-axis component of the grid-connected current for the voltage source mode, and $i_{gq1}$ denotes the q-axis component of the grid-connected current for the voltage source mode.

In some embodiments, $K_{vc\_p}=4$ and $K_{vc\_i}=10$.

Step 1.8, obtaining, based on the dq-axis components $u_{d1}$, $u_{q1}$ of the control signal in the voltage source mode, control signals $u_{a1}$, $u_{b1}$, $u_{c1}$ of the voltage source mode in the three-phase stationary coordinate system through the transformation from the two-phase rotating coordinate system to the three-phase stationary coordinate system.

In some embodiments, the processor may realize the transformation from the two-phase rotating coordinate system to the three-phase stationary coordinate system using an inverse matrix of the coordinate transformation matrix. The grid-connected inverter may control the voltage value of the voltage output in the voltage source mode based on the control signals $u_{a1}$, $u_{b1}$, $u_{c1}$ of the voltage source mode in the three-phase stationary coordinate system.

Figure 9:
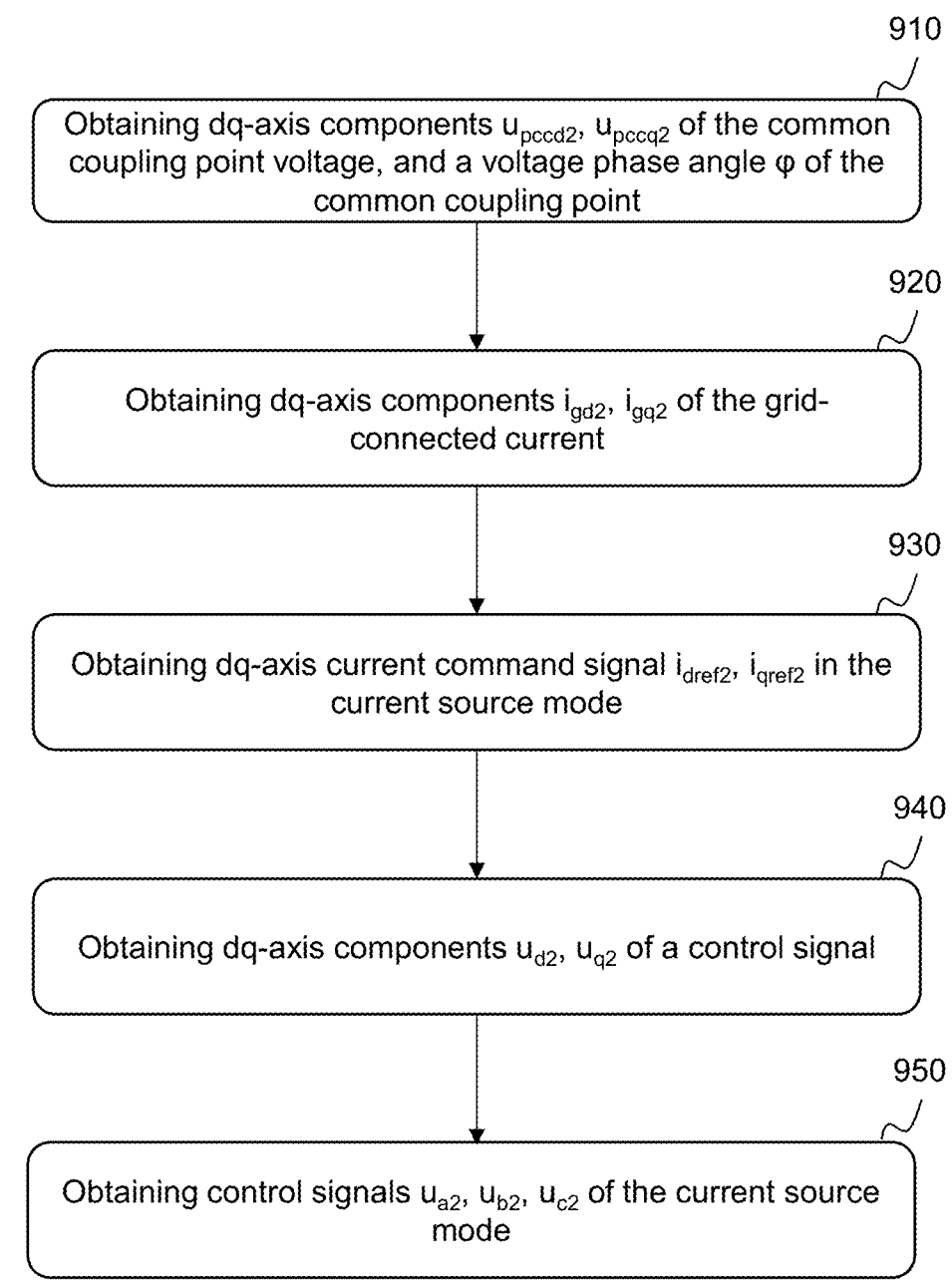
FIG. 9 is a flowchart illustrating an exemplary process for controlling the grid-connected inverter to operate in the current source mode according to some embodiments of the present disclosure.

In some embodiments, as shown in FIG. 9, the controlling the grid-connected inverter to operate in the current source mode in step 2 may include the following steps:

Step 2.1, obtaining, based on the three-phase voltages $u_{pcca}$, $u_{pccb}$, $u_{pccc}$ of the common coupling point, dq-axis components $u_{pccd2}$, $u_{pccq2}$ of the common coupling point voltage in the current source mode through the transformation from the three-phase stationary coordinate system to the two-phase rotating coordinate system; and obtaining, based on the q-axis component $u_{pccq2}$ of the common coupling point voltage in the current source mode, the voltage phase angle $\varphi$ of the common coupling point through the phase-locked loop control.

The phase-locked loop control refers to a synchronized control of the frequency and phase achieved by utilizing a feedback control principle. The phase-locked loop control may convert an unstable high-frequency signal into a stable low-frequency signal and synchronize the signal with a reference clock. The voltage phase angle refers to the angle between a voltage phasor and a current phasor, i.e., a phase difference between the voltage and the current.

In some embodiments, a formula for calculating the voltage phase angle $\varphi$ at the common coupling point may include:

$$\varphi=[\omega_n-(K_{p\_PLL}+K_{i\_PLL}/S)\times u_{pccq2}]/s$$

where, $\omega_n$ denotes a rated angular frequency of the system, $K_{p\_PLL}$ denotes a proportional coefficient of a phase-locked loop PI regulator, $K_{i\_PLL}$ denotes an integral coefficient of a phase-locked loop PI regulator, and $u_{pccq2}$ denotes the q-axis component of the common coupled-point voltage in the current source mode. In some embodiments, $\omega_n=100\pi$, $K_{p\_PLL}=0.2776$, $K_{i\_PLL}=11.9882$.

Step 2.2, obtaining, based on the voltage phase angle $\varphi$ of the common coupling point and the grid-connected three-phase current $i_{ga}$, $i_{gb}$, $i_{gc}$, dq-axis components $i_{gd2}$, $i_{gq2}$ of the grid-connected current in current source mode through the transformation from the three-phase stationary coordinate system to the two-phase rotating coordinate system. In some embodiments, the processor may realize the transformation from the three-phase stationary coordinate system to the two-phase rotating coordinate system through the coordinate transformation matrix. The grid-connected current dq-axis components $i_{gd2}$, $i_{gq2}$ of the current source mode may be the grid-connected current in the two-phase rotating coordinate system.

Step 2.3, obtaining, based on the active power command signal $P_{ref}$ and the reactive power command signal $Q_{ref}$ and the d-axis component $u_{pccd2}$ of the common coupling point voltage in the current source mode, dq-axis current command signal $i_{dref2}$, $i_{qref2}$ in the current source mode. The d-axis component $u_{pccd2}$ of the common coupling point voltage and the dq-axis current command signals $i_{dref2}$, $i_{qref2}$ of the current source mode may both be in the two-phase rotating coordinate system.

In some embodiments, the formula for calculating the dq-axis current command signals $i_{dref2}$, $i_{qref2}$ in the current source mode may include:

$$i_{dref2}=P_{ref}/[1.5u_{pccd2}/(T_{filter2}\times s+1)]$$

$$i_{qref2}=-Q_{ref}/[1.5u_{pccd2}/(T_{filter2}\times s+1)]$$

where, $T_{filter2}$ denotes a time constant of a power calculation of a low-pass filter in the current source mode, $i_{dref2}$ denotes the d-axis current command signal for the current source mode, $i_{qref2}$ denotes the q-axis current command signal for the current source mode, $P_{ref}$ denotes the active power command signal, $Q_{ref}$ denotes the reactive power command signal, $u_{pccd2}$ denotes the d-axis component of the common coupling point voltage for the current source mode, and $u_{pccd2}$ denotes the q-axis component of the common coupling point voltage for the current source mode.

In some embodiments, $T_{filter2}=0.2$ s.

Step 2.4, obtaining, based on the dq-axis current command signal $i_{dref2}$, $i_{qref2}$ in the current source mode and the dq-axis components $i_{gd2}$, $i_{gq2}$ of the grid-connected current in the current source mode, dq-axis components $u_{d2}$, $u_{q2}$ of a control signal in the current source mode through a current closed-loop control equation of the current source mode.

In some embodiments, the current closed-loop control equation for the current source mode may be different from the current closed-loop control equation for the voltage source mode.

In some embodiments, the current closed-loop control equation for the current source mode may include:

$$u_{d2}=(K_{cc\_p}+K_{cc\_i}/s)(i_{dref2}-i_{gd2})$$

$$u_{q2}=(K_{cc\_p}+K_{cc\_i}/s)(i_{qref2}-i_{gq2})$$

where, $u_{d2}$ denotes the d-axis component of the control signal of the current source mode, $u_{q2}$ denotes the q-axis component of the control signal of the current source mode, $K_{cc\_p}$ denotes a proportional coefficient of the current closed-loop control PI regulator in the current source mode, and $K_{cc\_i}$ denotes an integral coefficient of the current closed-loop control PI regulator in the current source mode, $i_{dref2}$ denotes the d-axis current command signal for the current source mode, $i_{qref2}$ denotes the q-axis current command signal for the current source mode, $i_{gd2}$ denotes the d-axis component of the grid-connected current for the current source mode, and $i_{gq2}$ denotes the q-axis component of the grid-connected current for the current source mode.

In some embodiments, $K_{cc\_p}$=1 and $K_{cc\_i}$=270.

Step 2.5, obtaining, based on the voltage phase angle φ of the common coupling point and the dq-axis components $u_{d2}$, $u_{q2}$ of the control signal in the current source mode, control signals $u_{a2}$, $u_{b2}$, $u_{c2}$ of the current source mode in the three-phase stationary coordinate system through the transformation from the two-phase rotating coordinate system to the three-phase stationary coordinate system.

In some embodiments, the processor may realize the transformation from the two-phase rotating coordinate system to the three-phase stationary coordinate system through the inverse matrix of the coordinate transformation matrix. The grid-connected inverter may control the voltage value output in the current source mode according to the control signals $u_{a2}$, $u_{b2}$, $u_{c2}$ in the three-phase stationary coordinate system.

In some embodiments, the control signals $u_{a1}$, $u_{b1}$, $u_{c1}$ in the voltage source mode generated in step 1.8 and the control signals $u_{a2}$, $u_{b2}$, $u_{c2}$ in the current source mode generated in step 2.5 may be modulated by Space Vector Pulse Width Modulation (SVPWM) to generate a switching signal of a power device of the grid-connected inverter, and the switching signal may control turn-on and turn-off of the power device of the three-phase full-bridge grid-connected inverter through a drive protection circuit.

The SVPWM refers to a process of tracking an accurate magnetic chain circle of a PWM waveform formed by switching different switch mode of a three-phase inverter (e.g., the grid-connected inverter) using an ideal magnetic chain circle of a three-phase symmetrical motor stator with three-phase symmetrical sinusoidal voltages as a reference standard, when supplying power with a three-phase symmetrical sine wave voltage. The SVPWM considers the inverter system and an asynchronous motor as a whole, which makes the model simpler and facilitates a real-time microprocessor control.

Figure 3:
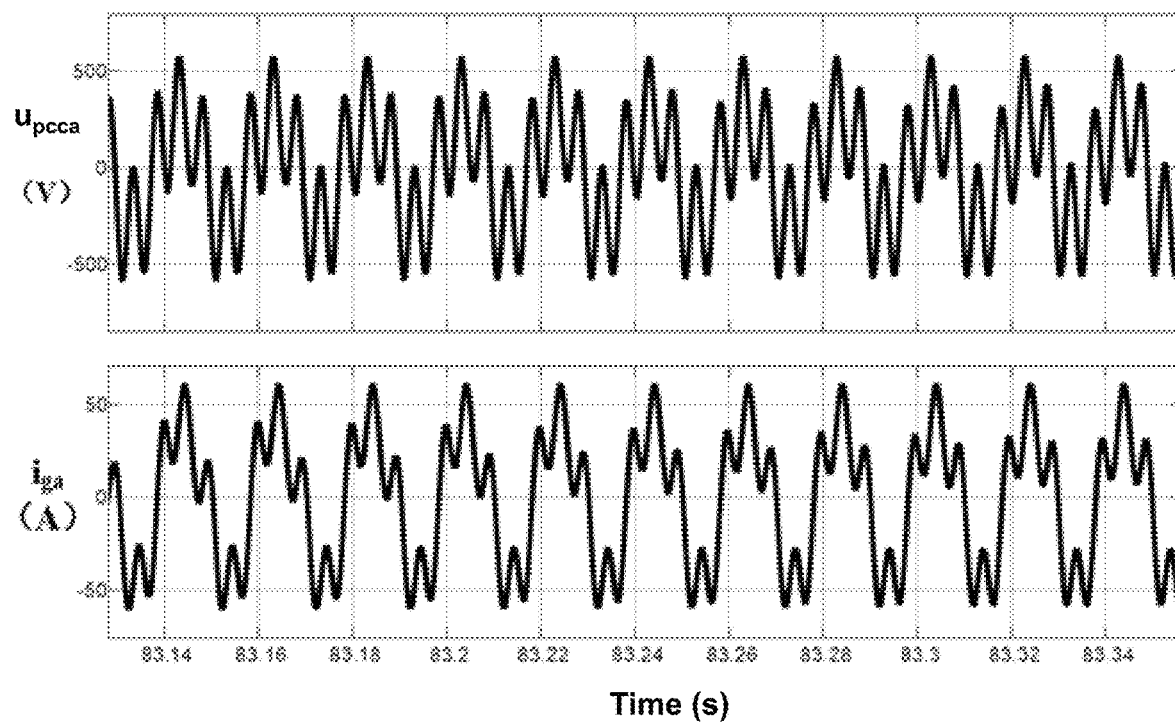
FIG. 3 is a schematic diagram illustrating waveforms of $u_{pcca}$ and $i_{ga}$ at SCR=2 for a separate current source mode according to some embodiments of the present disclosure.
Figure 4:
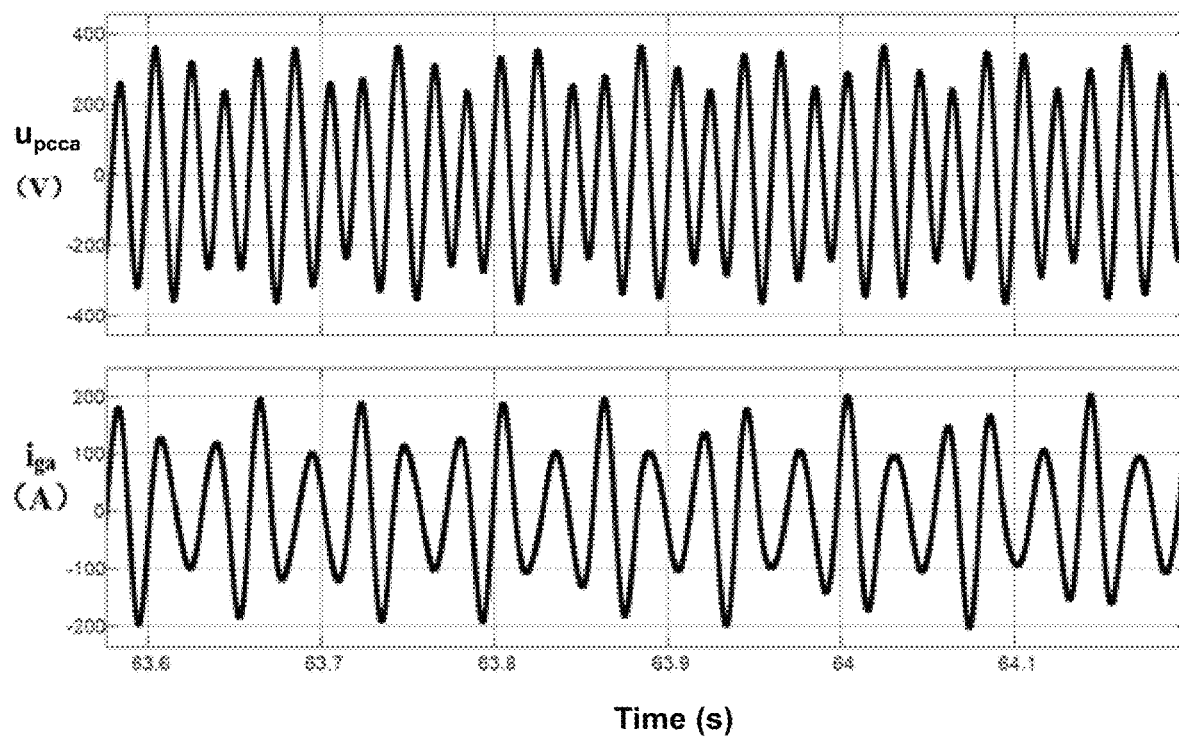
FIG. 4 is a schematic diagram illustrating waveforms of $u_{pcca}$ and $i_{ga}$ at SCR=9 for a separate voltage source mode according to some embodiments of the present disclosure.
Figure 5:
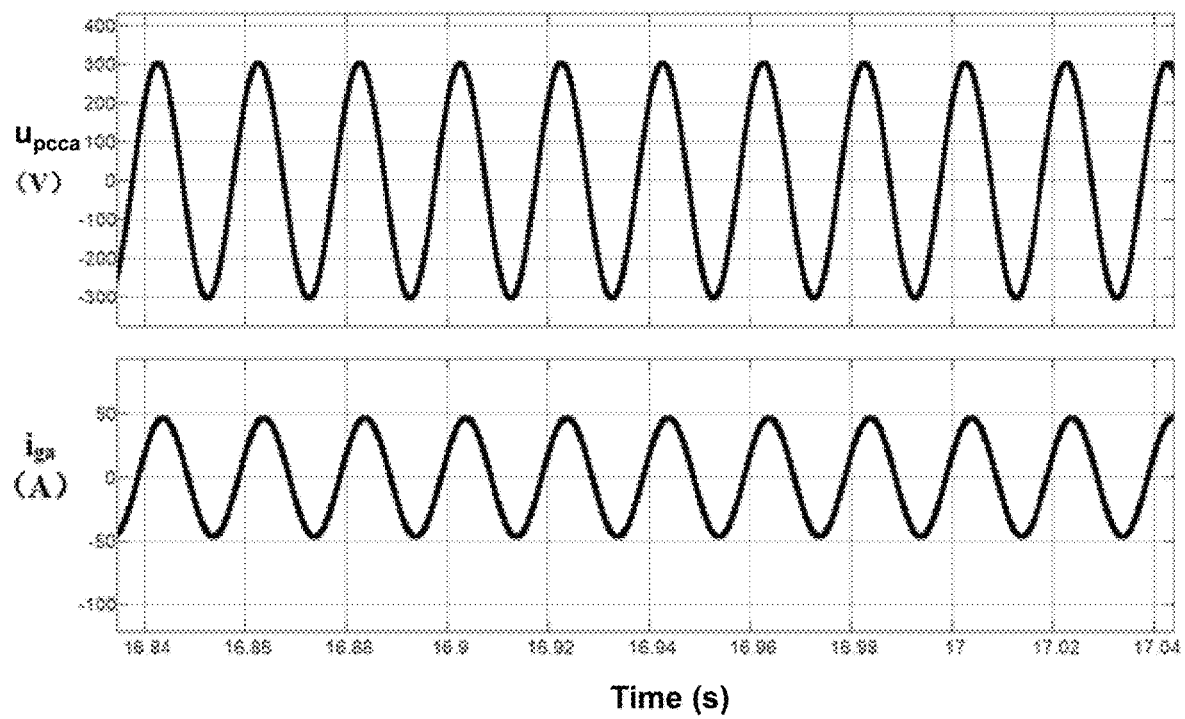
FIG. 5 is a schematic diagram illustrating waveforms of $u_{pcca}$ and $i_{ga}$ at SCR=1.5 according to some embodiments of the present disclosure.
Figure 6:
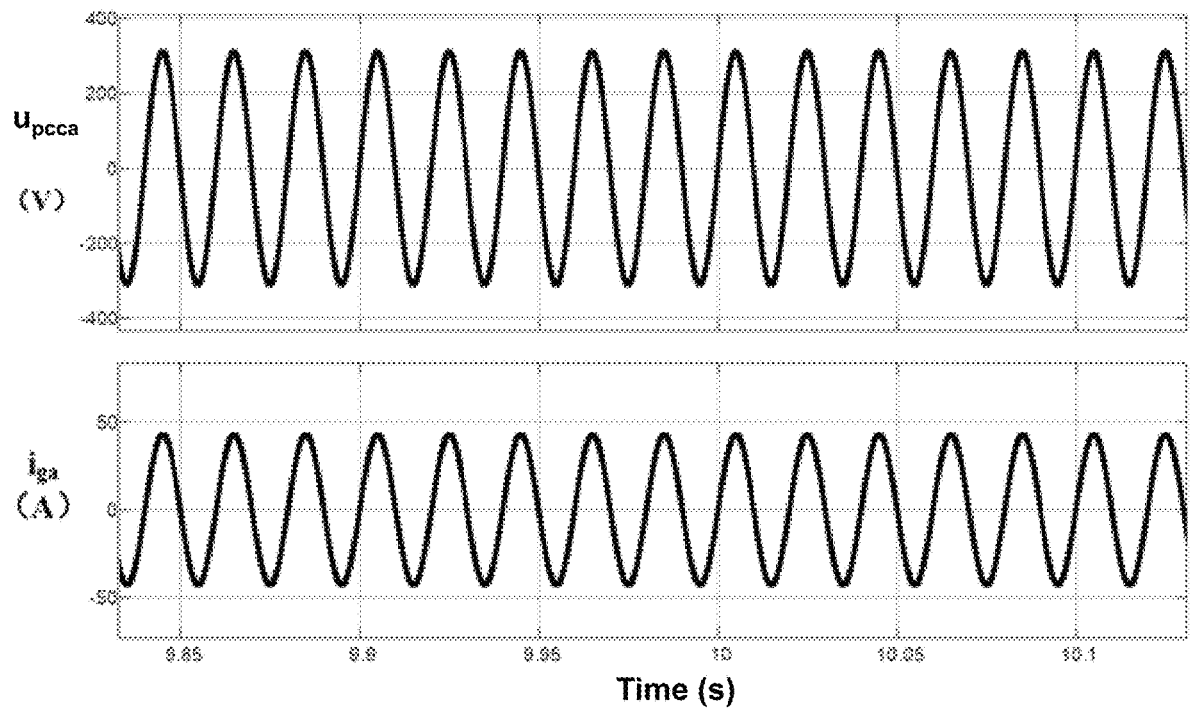
FIG. 6 is a schematic diagram illustrating waveforms of $u_{pcca}$ and $i_{ga}$ at SCR=10 according to some embodiments of the present disclosure.

To corroborate beneficial effects of the embodiments of the present disclosure, a MATLAB and/or Simulink simulation of the embodiments of the present disclosure is performed. FIG. 3 shows the waveforms of $u_{pcca}$ and $i_{ga}$ under the current source mode control with Lg=11.55 mH, i.e., the short circuit ratio SCR=2, FIG. 4 shows the waveforms of $u_{pcca}$ and $i_{ga}$ under the voltage source mode control with Lg=2.57 mH, i.e., the SCR=9. FIG. 5 shows the waveforms of $u_{pcca}$ and $i_{ga}$ under a hybrid control of the embodiment of the present disclosure with Lg=15.4 mH, i.e., the SCR=1.5, and FIG. 6 shows the waveforms of $u_{pcca}$ and $i_{ga}$ under the hybrid control of the embodiment of the present disclosure with Lg=2.31_mH, i.e., the SCR=10. Horizontal coordinates of FIG. 3, FIG. 4, FIG. 5, and FIG. 6 may be time, and vertical coordinates may be $u_{pcca}$ and $i_{ga}$, respectively. Lg denotes an inductive component of the grid impedance Zg, $u_{pcca}$ denotes an a-phase voltage among the three-phase voltages at the common coupling point, and $i_{ga}$ denotes the a-phase current among the three-phase currents in the grid-connected.

As shown in FIG. 3, the grid-connected inverter under the current source mode may not operate stably when SCR=2; as shown in FIG. 4, the grid-connected inverter under the voltage source mode may not operate stably when SCR=9; as shown in FIG. 5 and FIG. 6, when SCR=1.5 and SCR=10, the grid-connected inverter under the hybrid control of the embodiments of the present disclosure may be stably operated. It may be seen that the method of the embodiments of the present disclosure may substantially improve the stability of the grid-connected inverter under the conditions of SCR change.

Figure 7:
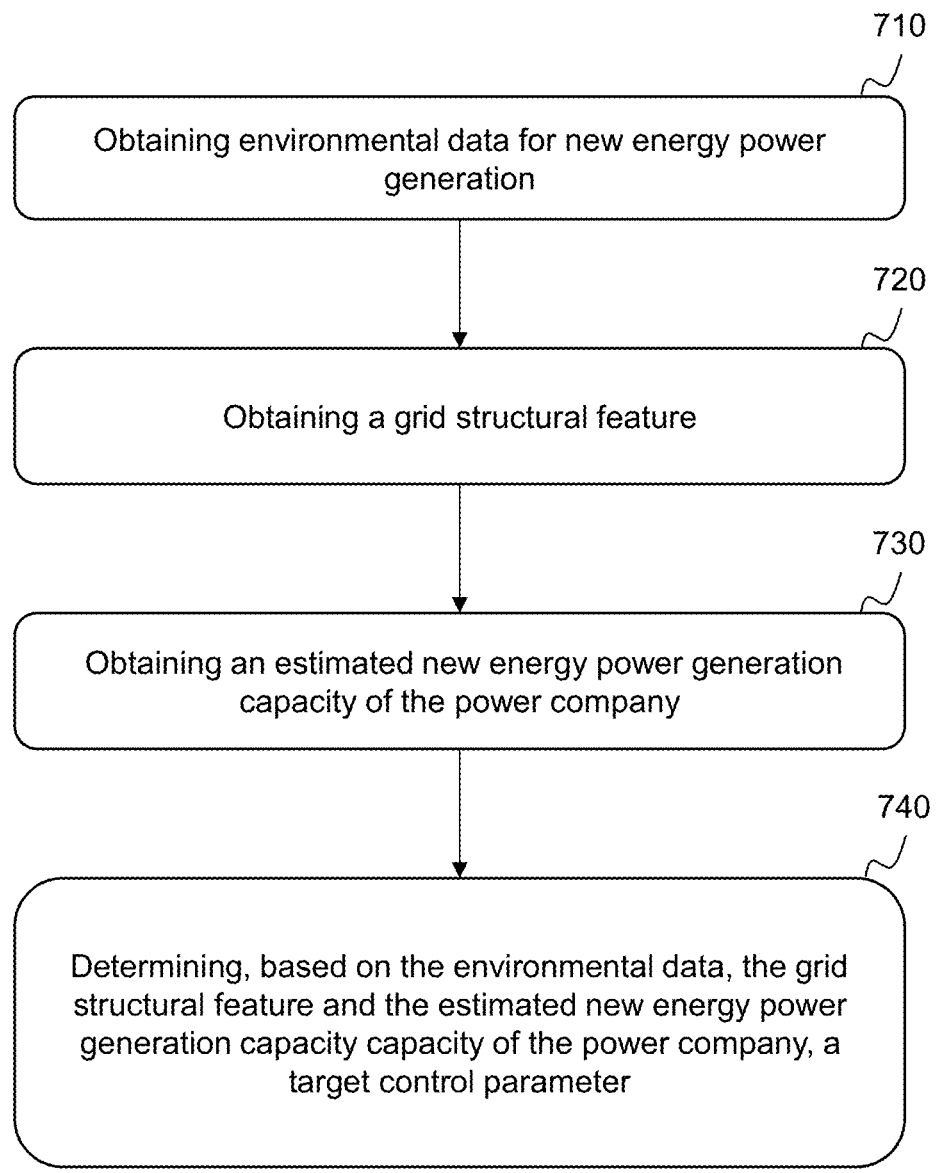
FIG. 7 is a flowchart illustrating an exemplary process for determining a target control parameter according to some embodiments of the present disclosure.

FIG. 7 is a flowchart illustrating an exemplary process for determining a target control parameter according to some embodiments of the present disclosure. In some embodiments, a process 700 may be executed by a controller. As shown in FIG. 7, the process 700 may specifically include the following steps:

In 710, obtaining environmental data for new energy power generation.

The environmental data refers to data related to the environment around a new energy power generation plant. In some embodiments, the environmental data may include at least one of a temperature, a humidity, a light, and a wind.

In some embodiments, the processor may obtain environmental data via a weather forecast. In some embodiments, the processor may predict the environmental data in conjunction with related data, such as a weather forecast, etc.

Step 720, obtaining a grid structural feature.

The grid structural feature may be a structural feature of a grid connected to the new energy power generation. In some embodiments, the processor may obtain the grid structural feature based on a grid design diagram. In some embodiments, the grid structural feature may include at least one of a grid line distribution and a resistance distribution.

In some embodiments, the processor may represent the grid line distribution and the resistance distribution in the form of vector based on the grid design diagram in advance, and take the vector as the grid structural feature. For example, the grid line distribution may be represented by vectors (L1, L2, . . . , Lm). m denotes a number of lines in the grid and L denotes a length of the lines; the resistance distribution may be represented by vectors (R1, R2, . . . , Rm), where m denotes the number of lines in the grid and R denotes the resistance of the lines.

Step 730, obtaining an estimated new energy power generation capacity of the power company.

The estimated new energy power generation capacity refers to a total amount of electricity generated by the new energy power generation plant in a future time period. In some embodiments, the processor may obtain the estimated new energy power generation capacity through a new energy power generation plan published on an official website of a power company. The processor may also obtain the estimated new energy power generation capacity through other means, which are not limited herein.

Step 740, determining, based on the environmental data, the grid structural feature and the estimated new energy power generation capacity of the power company, a target control parameter.

The target control parameter refers to a parameter controls an operation of the grid-connected inverter. In some embodiments, the target control parameter may include a number N of control cycles of the grid-connected inverter operating in the voltage source mode, and a number M of control cycles of the grid-connected inverter operating in the current source mode.

In the embodiments of the present disclosure, influences of the environmental data, the grid structure, and the estimated new energy power generation capacity on an intermittency and volatility of new energy power generation is considered to determine a more appropriate control parameter, allowing the grid-connected inverter to operate more stably.

In some embodiments, the processor may construct a vector database based on historical data, and determine the corresponding target control parameter based on a matching vector search. In some embodiments, the processor may construct a target feature vector based on the environmental data, the grid structural feature, and the estimated new energy power generation capacity of the power company. There may be various ways to construct the target feature vector. For example, the target feature vector may be constructed using manners such as Term Frequency-Inverse Document Frequency (TF-IDF), One-Hot, Word2Vec, etc.

The vector database may include a plurality of reference vectors and their corresponding reference control parameters. Each of the reference vectors may be constructed based on historical environmental data, historical grid structural feature, and historical estimated new energy power generation capacity of the power company. The construction of the reference vectors may be similar to that of the target feature vector. The reference control parameter may be constructed based on the historical target control parameters corresponding to the reference vector.

In some embodiments, the processor may determine the target control parameter based on a similarity between the target feature vector and the plurality of reference vectors in the vector database. For example, the reference vectors whose similarities with the target feature vectors satisfy a first preset condition may be taken as the target vector, and the reference control parameter corresponding to the target vector may be taken as the final target control parameter. The first preset condition may be set according to actual situations. For example, the similarity may be maximized, or the similarity may be greater than a threshold, etc. For another example, the vector distance may be minimized.

In some embodiments, the processor may also determine the target control parameter based on the environmental data, the grid structural feature, and the estimated new energy power generation capacity of the power company through the prediction model.

In some embodiments, the processor may generate at least one candidate control parameter. The candidate control parameter may also include a number of control cycles N for the grid-connected inverter to operate in the voltage source mode, a number of control cycles M for the grid-connected inverter to operate in the current source mode. The processor may determine one target control parameter from the at least one candidate control parameter.

In some embodiments, the processor may determine the number of control cycles N of the grid-connected inverter operating in the voltage source mode, and the number of control cycles M of the grid-connected inverter operating in the current source mode of at least one group of grid-connected inverters as the candidate control parameters.

In some embodiments, the processor may set a preset range of values for N, M, respectively. The preset range of values may also be determined by vector matching. In some embodiments, the processor may, based on the target vector, determine a plurality of reference vectors that satisfy the second preset condition by vector matching, and select the minimum N values and maximum N values of the multiple reference control parameters corresponding to the multiple reference vectors to construct the preset value range corresponding to N. The preset value range corresponding to N refers to a range between the minimum value to the maximum value of N.

In some embodiments, the processor may construct the preset value range corresponding to M by selecting a minimum M value and a maximum M value of the plurality of reference control parameters corresponding to the plurality of reference vectors. The corresponding preset value range of M is the range from the minimum M value to the maximum M value.

In some embodiments, the second preset condition may include a vector distance being less than a preset threshold. The preset threshold may be empirically set.

In some embodiments, the processor may randomly generate values of N and M within the preset value range to constitute the candidate control parameter. The processor may generate a certain number of candidate control parameter according to the above manner.

In some embodiments, the processor may predict, based on the environmental data, the grid structural feature, and the estimated new energy power generation capacity of the power company, a stability feature through the prediction model. The prediction model may be a machine learning model, for example, a convolutional neural network (CNN) model, etc.

The stability feature refers to a stability feature of the new energy power generation in a future period corresponding to each candidate control parameter, and may include the voltage stability at the common coupling point and the stability of the grid-connected current output by the grid-connected inverter, etc.

An inputs to the prediction model may include the candidate control parameter, the environmental data, the grid structural feature, the estimated new energy power generation capacity of the electric utility, and a future time period range. An output of the prediction model may include the stability feature of the new energy power generation for the future time period corresponding to the candidate control parameter. The future time period range may include a pre-set time period, such as a time period between two future time points.

In some embodiments, a future time period range may be represented by time points at both end of the time period. Merely as an example, t1 denotes the current moment in time, t2 denotes a first time in the future, t3 denotes a second time in the future, and t2 may be less than t3. The future time period range may be t2~t3, denoted as [t2, t3]. For example, if t2 is the 10th minute in the future, and t3 is the 20th minute in the future, the future time period range may be t2~t3, i.e., the 10th to 20th minute in the future, denoted as [10, 20].

In some embodiments, the prediction model may be obtained by training a plurality of training samples with labels. In some embodiments, each of the plurality of training samples may at least include a sample control parameter, sample environmental data, a sample grid structural feature, a sample estimated new energy power generation capacity of the power company, and a sample future time period range; and each of the plurality of labels is the stability feature of the new energy power generation corresponding to the training sample.

The training samples may be determined based on the historical data, each of the plurality of training samples includes a sample control parameter, sample environmental data, a sample grid structural feature, a sample estimated new energy power generation capacity of the power company, and a sample future time period range. In some embodiments, a training label may be labeled based on the historical data.

In some embodiments, the processor may determine the stability feature based on the grid-connected three-phase currents $i_{ga}$, $i_{gb}$, $i_{gc}$ and the three-phase voltages $u_{pcca}$, $u_{pccb}$, $u_{pccc}$ at the common coupling point. For example, the processor may determine the stability feature based on an a-phase voltage upcca of the three-phase voltages at the common coupling point and an a-phase current iga of the grid-connected three-phase currents.

In some embodiments, the processor may extract values and timestamps of peaks and valleys within a historical time period T from the waveforms of the a-phase voltage upcca at the common coupling point collected during a sample future time period range (i.e., the historical time period T) in the training samples. In some embodiments, the processor may extract the peak and valley values and the timestamps in the historical time period T for the waveforms of the a-phase current iga in the grid-connected current output by the grid-connected inverter collected during the historical time period T.

In some embodiments, the processor may further determine the voltage stability at the common coupling point. The processor may calculate a first standard deviation based on the plurality of voltage upcca peak values in the historical time period T. The processor may calculate a second standard deviation based on the plurality of peak values within the historical time period T. The processor may calculate a third standard deviation corresponding to a difference in timestamps of any neighboring peaks and valleys based on the plurality of timestamps within the historical time period T.

In some embodiments, the processor may further perform a weighted summation on the first standard deviation, the second standard deviation, and the third standard deviation, and use a summation result as the voltage stability of the common coupling point. The weights in the weighted summation process may be preset or adjusted according to actual situations.

In some embodiments, the processor may further determine the grid-connected current stability. For the grid-connected current stability, the determination may be performed in a manner similar to the determination of the voltage stability, i.e., a plurality of peak values, a plurality of valley values, and a plurality of time stamps of the current $i_{ga}$ during the historical time period T may be processed to obtain the grid-connected current stability of the grid-connected inverter output.

In some embodiments, the processor may input a plurality of labeled training samples to an initial prediction model. The initial prediction model may include, for example, a CNN model, etc. The processor may construct a loss function from the labels and the output of the initial prediction model, iteratively update the parameter of the initial prediction model based on the loss function, and obtain a trained prediction model. The model training may be completed when the loss function of the initial prediction model meets preset conditions, and the trained prediction model may be obtained. The preset conditions may be that the loss function converges, a number of iterations reaches a threshold, etc.

As there are a large number of samples in the training sample, the time period of the label corresponding to each sample may be the same or different. For example, the time period of the label corresponding to a sample A may be [10,20], the future time period range of the label corresponding to a sample B may be [10,30], and the future time period range of the label corresponding to sample C may be [20,100]. To cope with a wide variety of inputs, a diversity of the samples may also be as high as possible. For example, when predicting the stability of an [1,2] future time period range, in order to obtain a sufficiently accurate prediction result, in the training process of the prediction model, there needs to be a number of samples corresponding to labels within the [1,2] future time period range.

In some embodiments, the plurality of training samples with labels may correspond to a plurality of different future time period ranges, a number of the training samples corresponding to each of the plurality of different future time period ranges being positive correlated with a time span and/or a time distance of the future time period range. In other words, the longer the time span and/or the time distance of the future time period ranges, the greater the number of training samples corresponding to each future time period range in the plurality of different future time period ranges.

The time span refers to a duration of the future time period range. For example, if the future time period range of the label corresponding to the sample A is [10,20], the time span of the sample A may be 20–10=10. The time distance refers to a time difference between the more recent moment in the future time period range and the current moment. For example, if the future time period range of the label corresponding to the sample A is [15,20], then the time distance of sample A may be 15.

The number of samples with larger time spans may be accounted for more than the number of samples with smaller time spans in the training samples. Merely by way of example, the number of samples with a labeled time period of [10, 100] may account for more than the number of samples with a labeled time period of [20,40].

In some embodiments, the processor may determine a number of training samples corresponding to the future time period range based on the time span and/or the time distance of the future time period range and a preset correspondence.

The preset correspondence may be a correspondence between a temporal feature and a number of training samples, and the temporal feature may be a time span and/or a time distance. In some embodiments, the preset correspondence may include a correspondence between the time span and the number of training samples, a correspondence between the time distance and the number of training samples, and a correspondence between the time span, the time distance, and a number of training samples.

The stability may be more difficult to predict in situations where the time period spans a large, long distance. Thus, to more accurately predict the stability in such situations, the prediction accuracy of the prediction model may be increased in the embodiments of the present disclosure by increasing a number of such types of samples for different future time period ranges.

In some embodiments, the input to the prediction model may also include grid-connected inverter data, the grid-connected inverter data including at least one of a grid-connected inverter usage time, and a number of repairs.

Increasing the input data of the prediction model may improve the accuracy of the model prediction, which in turn leads to better target control parameters.

In some embodiments, the prediction model is a graph neural network model, and the grid structure feature may be represented by a graph structure. The graph structure may include a node and an edge, and the node may include a first-type node and a second-type node. The first-type node represents a line coupling point and the second-type node represents a line starting point. The node feature may include a number of coupled lines of the node. For example, for the second-type node, the node feature may be 1, indicating that a number of coupled lines of the node is 1.

The edge may represent a line connecting two nodes with a direct line connection relationship in the grid, and the edge feature may include a line length, a line resistance, and a line usage. The line usage may include a use duration, a number of repairs, etc.

In some embodiments, when the prediction model is the graph neural network model, the training of the prediction model may be similar to the training process described above. The sample grid structural feature in the training samples of the graph neural network model needs to be represented by graph structures as well.

Representing the grid structural feature through the graph structure may further show a setup relationship between the lines, which enables the prediction model to obtain more information about the grid, improves the accuracy of the model prediction, and then obtains the better target control parameters.

In some embodiments, the processor may determine the target control parameter based on the stability of the new energy power generation corresponding to each candidate control parameter. In some embodiments, the processor may perform a weighted sum on the voltage stability at the common coupling point of the output of the prediction model and the stability of the grid-connected current of the output of the grid-connected inverter as an overall stability of the candidate control parameter. The highest overall stability may be a minimal result of the weighted summation of the voltage stability at the common coupling point output by the prediction model and the stability of the grid-connected current output by the grid-connected inverter.

In the embodiment of the present disclosure, predicting the stability by prediction model may utilize a self-learning capability of the machine learning model to find a law from a large amount of historical data, and to obtain a relationship between the environmental data, the grid structural feature, the estimated new energy power generation capacity, the future time period range, etc., which improves the accuracy and efficiency of predicting the stability feature, and then determines more appropriate target control parameters.

It should be noted that the foregoing description of the process 700 is intended to be exemplary and illustrative only and does not limit the scope of application of the present disclosure. For those skilled in the art, various corrections and changes may be made to the process 700 under the guidance of the present disclosure. However, these corrections and changes remain within the scope of the present disclosure.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure, such as "an embodiment", "one embodiment", and/or "some embodiment" means a feature, structure, or characteristic associated with at least one embodiment of the present disclosure. Accordingly, it should be emphasized and noted that "one embodiment" or "an embodiment" or "an alternative embodiment" in different places in the present disclosure do not necessarily refer to the same embodiment. In addition, certain features, structures, or characteristics of one or more embodiments of the present disclosure may be suitably combined.

Additionally, the order of processing elements and sequences, the use of numerical letters, or the use of other names described herein are not intended to qualify the order of the processes and methods of the present disclosure, unless expressly stated in the claims. While some embodiments of the invention that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or in a description thereof. However, this method of disclosure does not imply that the objects of the present disclosure require more features than those mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about", "approximately", or "substantially", or "generally" is used in some examples. Unless otherwise noted, the terms "about," "approximately," or "approximately" indicates that a ±20% variation in the stated number is allowed. Correspondingly, in some embodiments, the numerical parameter used in the present disclosure and claims are approximations, which changes depending on the desired feature of individual embodiments. In some embodiments, the numerical parameter should consider the specified number of valid digits and employ general place-keeping. While the numerical domains and parameter used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., are hereby incorporated by reference in their entirety into the present disclosure. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall control. use shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for hybrid control of a grid-connected inverter based on time sharing of a voltage source and a current source, comprising at least one control process, each control process including N+M control cycles, wherein N is a number of control cycles of a grid-connected inverter operating in a voltage source mode, and M is a number of control cycles of the grid-connected inverter operating in a current source mode; the method comprising:

controlling the grid-connected inverter to operate in the voltage source mode, and counting once in each control cycle of the grid-connected inverter, wherein a count value is T, and each control process comprises:

step 1, controlling the grid-connected inverter to operate in the voltage source mode, and in response to an end of the each control cycle, comparing T and N:

in response to T<N, controlling the grid-connected inverter to continue operating in the voltage source mode, and counting the count value T once; and in response to T=N, controlling the grid-connected inverter to switch to the current source mode, assigning the count value T to zero, and entering step 2;

wherein the controlling the grid-connected inverter to operate in the voltage source mode in step 1 comprises:

step 1.1, setting an active power command signal $P_{ref}$ and a reactive power command signal $Q_{ref}$;

step 1.2, sampling grid-connected three-phase currents $i_{ga}$, $i_{gb}$, $i_{gc}$ output by the grid-connected inverter, sampling three-phase voltages $u_{pcca}$, $u_{pccb}$, $u_{pccc}$ with a common coupling point, and obtaining, based on the grid-connected three-phase currents $i_{ga}$, $i_{gb}$, $i_{gc}$ and the three-phase voltages $u_{pcca}$, $u_{pccb}$, $u_{pccc}$ with the common coupling point, αβ-axis components $i_{g\alpha}$, $i_{g\beta}$ of a grid-connected current and αβ-axis components $u_{pcc\alpha}$, $u_{pcc\beta}$ of a common coupling point voltage, respectively through a transformation from a three-phase stationary coordinate system to a two-phase stationary coordinate system;

step 1.3, obtaining, based on the αβ-axis components $i_{g\alpha}$, $i_{g\beta}$ of the grid-connected current and the αβ-axis components $u_{pcca}$, $u_{pccp}$ of the common coupling point voltage, an active grid-connected power $P_e$ and a reactive grid-connected power $Q_e$ through an average power calculation equation;

step 1.4, obtaining, based on the active grid-connected power $P_e$ and the reactive grid-connected power $Q_e$, an output angular frequency ω of the grid-connected inverter and a d-axis voltage command signal $u_{dref}$ through a droop control equation; and obtaining, based on the output angular frequency ω of the grid-connected inverter, an output angle θ of the grid-connected inverter, wherein θ=ω/s and s is a Laplacian operator;

step 1.5, obtaining, based on the grid-connected three-phase currents $i_{ga}$, $i_{gb}$, $i_{gc}$, the three-phase voltages $u_{pcca}$, $u_{pccb}$, $u_{pccc}$ of the common coupling point, and the output angle θ of the grid-connected inverter, dq-axis components $i_{gd1}$, $i_{gq1}$ of the grid-connected current in the voltage source mode and dq-axis components $u_{pccd1}$, $u_{pccq1}$ of the common coupling point voltage in the voltage source mode, respectively through a transformation from the three-phase stationary coordinate system to a two-phase rotating coordinate system;

step 1.6, setting a q-axis voltage command signal $u_{qref}$, and obtaining, based on the d-axis voltage command signal $u_{dref}$ and the dq-axis components $u_{pccd1}$, $u_{pccq1}$ of the common coupling point voltage in the voltage source mode, dq-axis components $i_{dref1}$, $i_{qref1}$ of a current command signal in the voltage source mode through a voltage closed-loop control equation of the voltage source mode;

step 1.7, obtaining, based on the dq-axis components $i_{gd1}$, $i_{gq1}$ of the grid-connected current in the voltage source mode and the dq-axis components $i_{dref1}$, $i_{qref1}$ of the current command signal in the voltage source mode, dq-axis components $u_{d1}$, $u_{q1}$ of a control signal in the voltage source mode through a current closed-loop control equation of the voltage source mode;

step 1.8, obtaining, based on the dq-axis components $u_{d1}$, $u_{q1}$ of the control signal in the voltage source mode, control signals $u_{a1}$, $u_{b1}$, $u_{c1}$ of the voltage source mode in the three-phase stationary coordinate system through the transformation from the two-phase rotating coordinate system to the three-phase stationary coordinate system;

step 2, controlling the grid-connected inverter to operate in the current source mode, and in response to the end of the each control cycle, comparing T and M:

in response to T<M, controlling the grid-connected inverter to continue operating in the current source mode, and counting the count value T once; and in response to T=M, controlling the grid-connected inverter to switch to the voltage source mode, assigning the count value T to zero, and entering step 3;

wherein the controlling the grid-connected inverter to operate in the current source mode in step 2 comprises:

step 2.1, obtaining, based on the three-phase voltages $u_{pcca}$, $u_{pccb}$, $u_{pccc}$ of the common coupling point, dq-axis components $u_{pccd2}$, $u_{pccq2}$ of the common coupling point voltage in the current source mode through the transformation from the three-phase stationary coordinate system to the two-phase rotating coordinate system; and obtaining, based on a q-axis component $u_{pccq2}$ of the common coupling point voltage in the current source mode, a voltage phase angle φ of the common coupling point through a phase-locked loop control;

step 2.2, obtaining, based on the voltage phase angle φ of the common coupling point and the grid-connected three-phase current $i_{ga}$, $i_{gb}$, $i_{gc}$, dq-axis components $i_{gd2}$, $i_{gq2}$ of the grid-connected current in current source mode through the transformation from the three-phase stationary coordinate system to the two-phase rotating coordinate system;

step 2.3, obtaining, based on the active power command signal $P_{ref}$ and the reactive power command signal $Q_{ref}$, and the d-axis component $u_{pccd2}$ of the common coupling point voltage in the current source mode, dq-axis current command signal $i_{dref2}$, $i_{qref2}$ in the current source mode;

step 2.4, obtaining, based on the dq-axis current command signal $i_{dref2}$, $i_{qref2}$ in the current source mode and the dq-axis components $i_{gd2}$, $i_{gq2}$ of the grid-connected current in the current source mode, dq-axis components $u_{d2}$, $u_{q2}$ of a control signal in the current source mode through a current closed-loop control equation of the current source mode;

step 2.5, obtaining, based on the voltage phase angle $\varphi$ of the common coupling point and the dq-axis components $u_{d2}$, $u_{q2}$ of the control signal in the current source mode, control signals $u_{a2}$, $u_{b2}$, $u_{c2}$ of the current source mode in the three-phase stationary coordinate system through the transformation from the two-phase rotating coordinate system to the three-phase stationary coordinate system; and step 3, returning to the step 1 and entering a next control process.

2. The method for hybrid control of the grid-connected inverter based on time sharing of the voltage source and the current source of claim 1, wherein the average power calculation equation in the step 1.3 includes:

where, $T_{filter1}$ denotes a time constant of an average power calculation of a low-pass filter.

3. The method for hybrid control of the grid-connected inverter based on time sharing of the voltage source and the current source of claim 1, wherein the droop control equation in the step 1.4 includes:

$$\omega=(P_{ref}-P_e)/m+\omega_n$$

$$u_{dref}=(Q_{ref}-Q_e)/n+V_{nAmp}$$

where, $\omega_n$ denotes a rated angular frequency of a system, $V_{nAmp}$ denotes a rated line voltage amplitude, m denotes an active power droop coefficient, and n denotes a reactive power droop coefficient.

4. The method for hybrid control of the grid-connected inverter based on time sharing of the voltage source and the current source of claim 1, wherein the voltage closed-loop control equation of the voltage source mode in the step 1.6 includes:

$$i_{dref1}=(K_{vv\_p}+K_{vv\_i}/S)/(u_{dref}-u_{pccd1})$$

$$i_{qref1}=(K_{vv\_p}+K_{vv\_i}/S)/(u_{qref}-u_{pccq1})$$

where, $K_{vv\_p}$ denotes a proportional coefficient of a voltage closed-loop control proportional-integral (PI) regulator in the voltage source mode, and $K_{vv\_i}$ denotes an integral coefficient of the voltage closed-loop control PI regulator in the voltage source mode.

5. The method for hybrid control of the grid-connected inverter based on time sharing of the voltage source and the current source of claim 1, wherein the current closed-loop control equation of the voltage source mode in the step 1.7 includes:

$$u_{d1}=(K_{vc\_p}+K_{vc\_i}/S)/(i_{dref1}-i_{gd1})$$

$$u_{q1}=(K_{vc\_p}+K_{vc\_i}/S)/(i_{qref1}-i_{gq1})$$

where, $K_{vc\_p}$ denotes a proportional coefficient of a current closed-loop control PI regulator in the voltage source mode, and $K_{vc\_i}$ denotes an integral coefficient of the current closed-loop control PI regulator in the voltage source mode.

6. The method for hybrid control of the grid-connected inverter based on time sharing of the voltage source and the current source of claim 1, wherein in the step 2.1, the obtaining, based on the q-axis component $u_{pccq2}$ of the common coupling point voltage in the current source mode, the voltage phase angle $\varphi$ of the common coupling point through the phase-locked loop control includes:

$$\varphi=[\omega_n-(K_{p\_PLL}+K_{i\_PLL}/S)\times u_{pccq2}]/s$$

where, $\omega_n$ denotes a rated angular frequency of a system, $K_{p\_PLL}$ denotes a proportional coefficient of a phase-locked loop PI regulator, and $K_{i\_PLL}$ denotes an integral coefficient of a phase-locked loop PI regulator.

7. The method for hybrid control of the grid-connected inverter based on time sharing of the voltage source and the current source of claim 1, wherein equations for calculating the dq-axis current command signal $i_{dref2}$, $i_{qref2}$ in the current source mode of a current command signal in the current source mode in the step 2.3 includes:

where, $T_{filter2}$ denotes a time constant of a power calculation of a low-pass filter in the current source mode.

8. The method for hybrid control of the grid-connected inverter based on time sharing of the voltage source and the current source of claim 1, wherein the current closed-loop control equation of the current source mode in the step 2.4 includes:

$$u_{d2}=(K_{cc\_p}+K_{cc\_i}/s)(i_{dref2}-i_{gd2})$$

$$u_{q2}=(K_{cc\_p}+K_{cc\_i}/s)(i_{qref2}-i_{gq2})$$

where, $K_{cc\_p}$ denotes a proportional coefficient of the current closed-loop control PI regulator in the current source mode, and $K_{cc\_i}$ denotes an integral coefficient of the current closed-loop control PI regulator in the current source mode.

* * * * *